US011847192B2

(12) United States Patent
Bangole et al.

(10) Patent No.: US 11,847,192 B2
(45) Date of Patent: *Dec. 19, 2023

(54) IN-VEHICLE CONTENT DELIVERY SYSTEM OPERABLE IN AUTONOMOUS MODE AND NON-AUTONOMOUS MODE

(71) Applicant: GOGO BUSINESS AVIATION LLC, Broomfield, CO (US)

(72) Inventors: Premkumar Bangole, Bloomingdale, IL (US); Bryan Adrian Lauer, Chicago, IL (US); Patrick J. Walsh, Naperville, IL (US); Kathy Wang, Buffalo Grove, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,070

(22) Filed: Sep. 17, 2021

(65) Prior Publication Data

US 2022/0004600 A1   Jan. 6, 2022

Related U.S. Application Data

(63) Continuation of application No. 16/257,972, filed on Jan. 25, 2019, now Pat. No. 11,138,293, which is a (Continued)

(51) Int. Cl.
*G06F 21/10* (2013.01)
*H04L 9/40* (2022.01)
(Continued)

(52) U.S. Cl.
CPC .............. *G06F 21/10* (2013.01); *H04L 9/083* (2013.01); *H04L 63/0428* (2013.01);
(Continued)

(58) Field of Classification Search
CPC .......... G06F 21/10; G06F 21/30; H04W 4/46; H04W 4/48; H04W 12/084;
(Continued)

(56) References Cited

U.S. PATENT DOCUMENTS 4,658,292 A   4/1987 Okamoto et al.
4,864,615 A   9/1989 Bennett et al.
(Continued)

FOREIGN PATENT DOCUMENTS

EP   0343805 B1   10/1997
JP   3792896 B2 * 7/2006 ............. G06F 21/10
(Continued)

OTHER PUBLICATIONS

Ciphertext, Wikipedia, the free encyclopedia, 2014, http://en.wikipedia.org/wiki/ciphertext, 3 pages.
(Continued)

*Primary Examiner* — Ayoub Alata
(74) *Attorney, Agent, or Firm* — MARSHALL, GERSTEIN & BORUN LLP; Randall G. Rueth

(57) ABSTRACT

Multimedia content may be delivered to content consumer devices via a content-delivery network. Encrypted content and cryptography keys for decrypting the content may be distributed from a data center to various nodes of the content-delivery network, each node acting as a semi-independent content-delivery system. Each content-delivery system is capable of delivering received content to end-users and implementing a key-management scheme to facilitate secure content-delivery and usage tracking, even when the content-delivery system is disconnected from the data center. In other words, the disclosed systems and methods facilitate the operation of nodes which may operate in "autonomous mode" when disconnected from a larger content-delivery network, thus maintaining content-delivery
(Continued)

capabilities despite having little if any connectivity to external networks.

20 Claims, 13 Drawing Sheets

Related U.S. Application Data continuation of application No. 15/222,219, filed on Jul. 28, 2016, now Pat. No. 10,235,503, which is a continuation of application No. 14/530,409, filed on Oct. 31, 2014, now Pat. No. 9,426,650.

(51) Int. Cl.
| | |
|---|---|
| H04W 4/46 | (2018.01) |
| H04L 9/08 | (2006.01) |
| H04W 4/48 | (2018.01) |
| H04W 12/041 | (2021.01) |
| H04W 12/084 | (2021.01) |
| H04W 12/0431 | (2021.01) |
| H04L 65/612 | (2022.01) |
| G06F 21/30 | (2013.01) |
| H04L 43/10 | (2022.01) |

(52) U.S. Cl.
CPC .............. *H04L 63/06* (2013.01); *H04L 63/10* (2013.01); *H04L 65/612* (2022.05); *H04W 4/46* (2018.02); *H04W 4/48* (2018.02); *H04W 12/041* (2021.01); *H04W 12/0431* (2021.01); *H04W 12/084* (2021.01); *G06F 21/30* (2013.01); *H04L 43/10* (2013.01); *H04L 63/062* (2013.01); *H04L 2209/60* (2013.01); *H04L 2209/76* (2013.01); *H04L 2209/84* (2013.01)

(58) Field of Classification Search
CPC ............ H04W 12/0431; H04W 12/041; H04L 65/612; H04L 9/083; H04L 63/0428; H04L 63/06; H04L 63/10; H04L 43/10; H04L 63/062; H04L 2209/60; H04L 2209/76; H04L 2209/84
See application file for complete search history.

(56) References Cited

U.S. PATENT DOCUMENTS

| | | | |
|---|---|---|---|
| 5,963,646 A | 10/1999 | Fielder et al. | |
| 6,226,618 B1 | 5/2001 | Downs et al. | |
| 6,725,035 B2 | 4/2004 | Jochim et al. | |
| 7,328,458 B2 | 2/2008 | Yamanaka et al. | |
| 7,702,328 B2 | 4/2010 | Lemond et al. | |
| 7,840,489 B2 | 11/2010 | Candelore | |
| 7,970,135 B1 | 6/2011 | Schwenk | |
| 8,069,116 B2 | 11/2011 | Gilliam et al. | |
| 8,078,163 B2 | 12/2011 | Lemond et al. | |
| 8,457,627 B2 | 6/2013 | Lauer | |
| 8,590,028 B2 | 11/2013 | Saxena et al. | |
| 2002/0077985 A1 | 6/2002 | Kobata et al. | |
| 2004/0083391 A1 | 4/2004 | De Jong | |
| 2006/0143133 A1 | 6/2006 | Medvinsky | |
| 2006/0235796 A1* | 10/2006 | Johnson | G06Q 20/4014 705/26.1 |
| 2008/0141314 A1 | 6/2008 | Lemond et al. | |
| 2012/0076204 A1 | 3/2012 | Raveendran et al. | |
| 2012/0124159 A1 | 5/2012 | Takahashi | |
| 2012/0284804 A1 | 11/2012 | Lindquist et al. | |
| 2013/0174223 A1 | 7/2013 | Dykeman et al. | |
| 2014/0189888 A1 | 7/2014 | Madhok et al. | |
| 2014/0282747 A1* | 9/2014 | Richman | H04W 76/15 725/62 |
| 2016/0127334 A1 | 5/2016 | Bangole et al. | |
| 2016/0127895 A1 | 5/2016 | Bangole et al. | |

FOREIGN PATENT DOCUMENTS

| | | |
|---|---|---|
| WO | WO-2008154308 A1 | 12/2008 |
| WO | WO-2013112901 A1 | 8/2013 |

OTHER PUBLICATIONS

Cryptographic hash function, Wikipedia, the free encyclopedia, 2014, http://en.wikipedia.org/wiki/cryptographic_hash_function, 5 pages.
Digital signature, Wikipedia, the free encyclopedia, 2014, http://en.wikipedia.org/wiki/digital_signature, 10 pages.
Information security, Wikipedia, the free encyclopedia, 2014, http://en.wikipedia.org/wiki/information_security#key_concepts, 22 pages.
Liu et al., Digital rights management for content distribution, Australian Computer Society, Inc., vol. 21., 10 pages (2003).
Public key certificate, Wikipedia, the free encyclopedia, 2014, http://en.wikipedia.org/wiki/public_key_certificate, 6 pages.
Nonfinal Office Action, U.S. Appl. No. 14/530,423, dated Feb. 1, 2016.
Non-Final Office Action for U.S. Appl. No. 14/530,409, dated Dec. 21, 2015.

* cited by examiner

IN-VEHICLE CONTENT DELIVERY SYSTEM OPERABLE IN AUTONOMOUS MODE AND NON-AUTONOMOUS MODE

CROSS-REFERENCE TO RELATED APPLICATIONS

This application is a continuation of (i) U.S. application Ser. No. 16/257,972, filed Jan. 25, 2019 and titled "In-Vehicle Content Delivery System Operable in Autonomous Mode and Non-Autonomous Mode," which is a continuation of (ii) U.S. application Ser. No. 15/222,219, filed Jul. 28, 2016 and titled "In-Vehicle Content Delivery System Operable in Autonomous Mode and Non-Autonomous Mode," which is a continuation of (iii) U.S. application Ser. No. 14/530,409, filed Oct. 31, 2014 and titled "Autonomous-Mode Content Delivery and Key Management," which is related to (iv) U.S. patent application Ser. No. 14/530,423 titled "Resumption of Play for a Content-Delivery Session," filed Oct. 31, 2014, the contents of each of which are hereby incorporated by reference in their entirety.

TECHNICAL FIELD

The present disclosure generally relates to delivering multimedia content to consumer electronic devices, and, in particular, to a system that utilizes one or more content delivery systems to deliver the multimedia content.

BACKGROUND

Airline passengers typically have limited entertainment options when in-flight. As a result, passengers often utilize personal electronic devices when travelling. Personal electronic devices, however, have a number of limitations when relied on for in-flight entertainment. In particular, entertainment options often remain limited due to isolation from external networks such as the Internet. Even when connection to external networks is possible, network access can be expensive and download speeds can be frustratingly slow for passengers who often expect on-demand availability of high quality multimedia content. As a result, a passenger's content options are often limited to multimedia content he or she loaded to a personal device before the trip.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The methods and systems disclosed herein may be used to securely deliver multimedia content to content consumer devices via one or more content-delivery systems ("CDSs") of a content-delivery network. The content consumer devices may decrypt encrypted content (using, e.g., one or more keys received from a CDS) and display the content via a display component. The content (and cryptography keys for decrypting the content) may be distributed to the CDSs from a data center.

In addition to delivering received content to end-users, each CDS is capable of implementing a key-management scheme to facilitate secure content-delivery and usage tracking, even when the CDS is disconnected from the data center that originally distributed the content and/or keys. Accordingly, the disclosed systems and methods facilitate the operation of CDSs which may operate in "autonomous mode" when disconnected from a larger content-delivery network, maintaining secure content-delivery capabilities despite having little if any connectivity to external networks.

One or more of the CDSs may be disposed at a vehicle. Accordingly, the methods and systems disclosed herein may be especially beneficial for providing content-delivery services to passengers of a vehicle or group of vehicles (e.g., for a fleet of airplanes where connectivity to external networks may be limited or inconsistent).

A system for providing an in-vehicle content-delivery service to a consumer device may comprise a data center including a license server configured to provide one or more keys, from a key-store, for decrypting encrypted content. The system may also include a first CDS disposed at a first vehicle. The first CDS may include one or more memory devices storing a content-distribution from the data center. The content-distribution may include a first set of keys from the key-store for decrypting a first collection of encrypted content. The first CDS may also include a first proxy license server configured to determine whether license-data, stored at a memory of the first CDS, authorizes delivery, of first content-data from the first collection of encrypted content, responsive to a content-request received at the first CDS. The content-request received at the first CDS may be transmitted from a consumer device communicatively coupled to the first CDS. When the license-data authorizes delivery of the first content-data, the CDS may transmit, for reception by the first consumer device, a key from the first set of keys for decrypting the first content-data.

A computer-implemented method for providing an in-vehicle content-delivery service to a consumer device may comprise receiving, at a first content-delivery system ("CDS") disposed at a first vehicle, a content-distribution including a first set of keys from a key-store managed by a license server. The first set of keys are generally keys capable of decrypting a first collection of encrypted content. The method may further include storing the content-distribution to a memory of the first CDS. Additionally, the method may include receiving, at the first CDS, a first content-request transmitted from a first consumer device communicatively coupled to the first CDS. The method may also include causing a processor of the first CDS to determine whether license-data stored at a memory of the first CDS authorizes delivery, of first content-data from the first collection of encrypted content, responsive to the first content-request. The method may further include transmitting, for reception by the first consumer device, via a communication interface of the first CDS, a key from the first set of keys for decrypting the first content-data (e.g., when the processor determines that the license-data authorizes the delivery of the first content-data).

DETAILED DESCRIPTION

In recent years, airlines have increasingly focused on improving in-flight entertainment options for passengers. As an example, some airlines now load (e.g., via a USB thumbdrive) movies to a hard-drive located on an airplane before a flight. The movies are then provided to passengers via screens and headphone jacks that have been installed on the airplane. For example, some airlines have installed screens on the back of seat head-rests. In these scenarios, passengers sometimes have the ability to choose between a number of pre-recorded television or movie "channels" that display content loaded to the airplane before the flight. Generally speaking, these systems offer a small number of content options from which the passenger can choose.

As another example, some airlines provide services (such as Wi-Fi or other data delivery services) to enable a consumer device on-board a vehicle to access external networks. To establish communications for services to such consumer devices, providers often utilize a wireless communication link such as a direct Air-to-Ground (ATG) link or a satellite link over which communications or data is delivered to and from the vehicle. Unfortunately, communication links to external networks are sometimes unavailable (e.g., when the vehicle travels to a location that is outside of network coverage), slow or busy (e.g., with a queue of pending upload requests), or malfunctioning, thus rendering the on-board data services unavailable to or unusable by the consumer devices. Accordingly, a passenger often has limited access to external networks, reducing the passenger's entertainment options while in-flight.

The disclosed systems and methods enable a passenger to access content via a consumer electronic device, even when disconnected from external networks.

1. Example Content-delivery Networks ("CDN")

1.01 CDN 10a

Figure 1A:
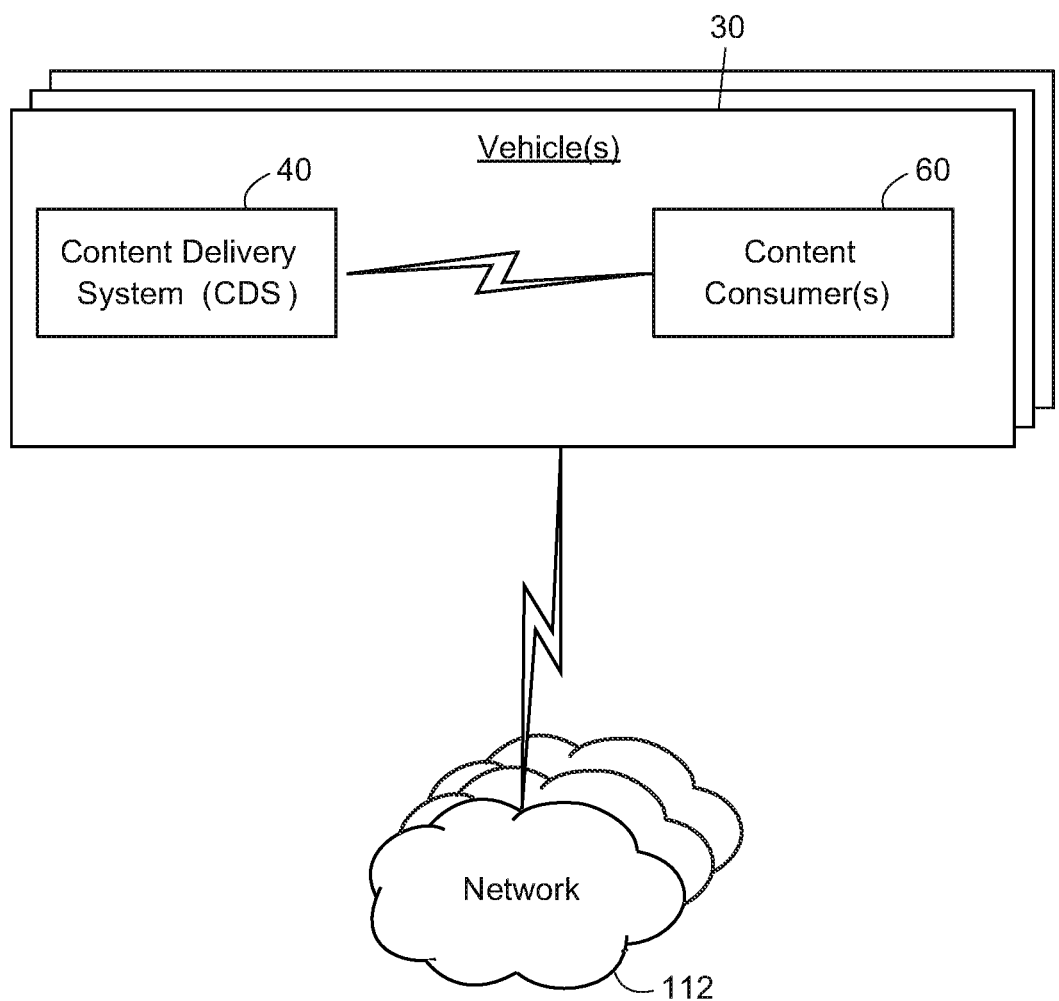
FIG. 1A illustrates an example CDN according to an embodiment.

FIG. 1A illustrates an example CDN 10a according to an embodiment. The CDN 10a includes content-delivery systems (CDSs) 40 (described in more detail with reference to FIG. 4), which are used to facilitate the management and monitoring of content-delivery to content consumers 60 (described in more detail with reference to FIG. 6).

The CDS 40 may deliver content to one or more consumers 60 regardless of its connection to the network 112. Typically, a CDS 40 and/or vehicle 30 are said to be operating in autonomous mode when not relying on external networks (e.g., network 112) to provide content, or keys for decrypting content, that is delivered to the consumers 60.

In an embodiment, the CDN 10a includes a plurality of vehicles 30. Each of the vehicles 30 may be communicatively connected (directly or indirectly) to one or more external networks 112 (i.e. network external to the vehicles 30). One or more of the vehicles 30 may have an on-board CDS 40. In certain instances, the CDSs 40 receive content (and/or keys for decrypting the content) via a network 112. Further, the CDSs 40 may report content-delivery via a network 112. Each vehicle 30 may provide, via a CDS 40, content to consumers 60 on-board (or proximate to) the respective vehicle 30. Generally speaking, "content" refers to multimedia content, and may include audio and/or visual information. Typical examples of content include movies, television shows, songs, video games, or any other content involving audio and/or visual presentation. In other words, content may include anything that can be provided as output at a display component (e.g., a screen) and/or audio component (e.g., a speaker) of a consumer device.

In an embodiment, the CDSs 40 are not vehicle-based. For example, the CDSs 40 may be independent or disposed at another structure, such as a building. Generally speaking, the CDN 10a may be useful in any environment where content consumers 60 can establish connection to a particular CDS 40, but are otherwise isolated (or likely to be isolated) from external networks 112 and other CDSs 40 of the CDN 10a. That is, the CDN 10a may be useful for providing content-delivery services to consumers in environments where network coverage (e.g., for connecting to the internet) is inconsistent or unreliable.

1.02 CDN 10b

Figure 1B:
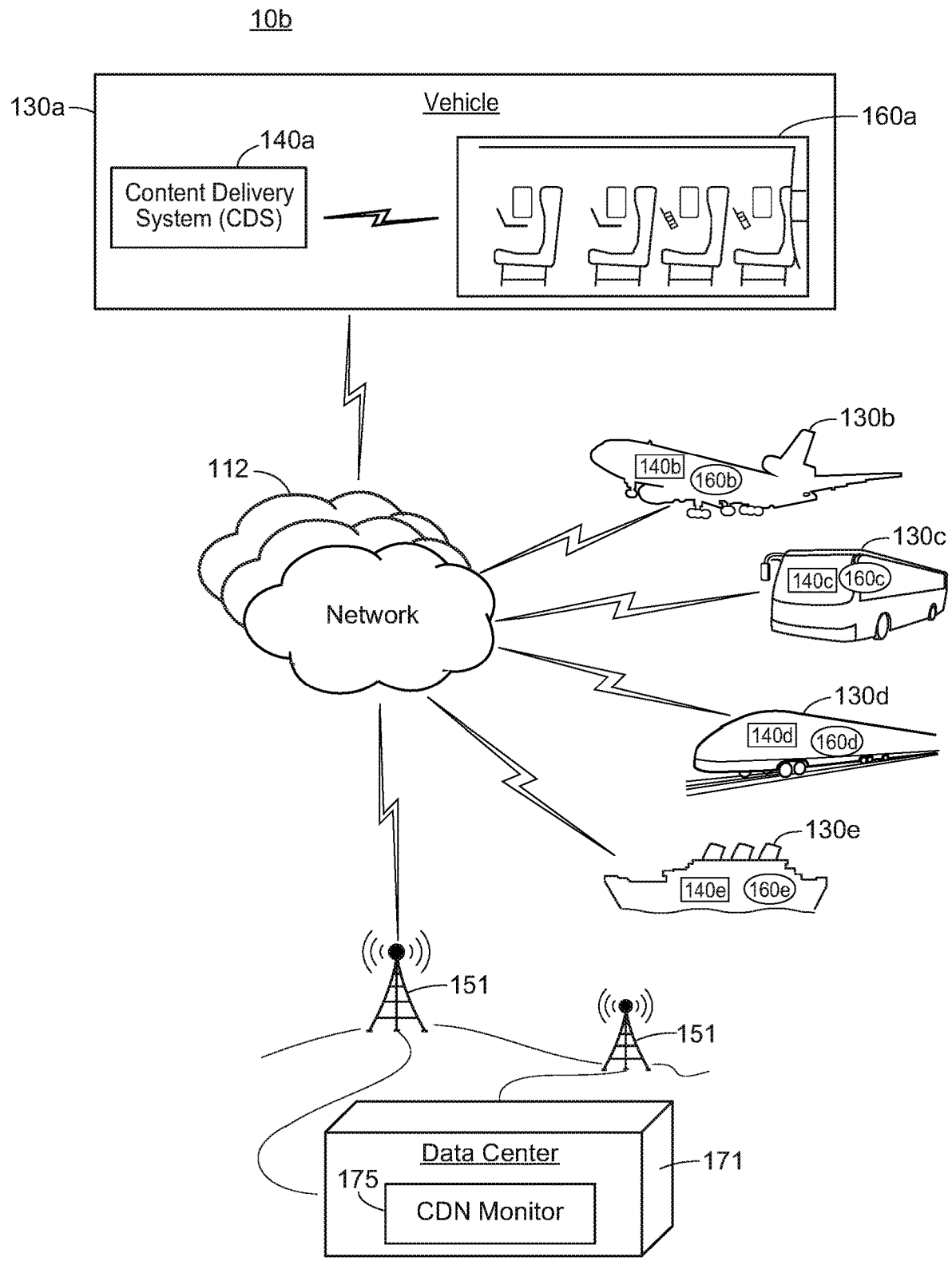
FIG. 1B illustrates an example CDN according to an embodiment.

FIG. 1B illustrates an example CDN 10b according to an embodiment. In operation, the CDN 10b facilitates managing and monitoring multimedia content-delivery to consumer devices at multiple vehicles (e.g., airplanes, ships, trains, buses, etc).

For example, the CDN 10b may be utilized to manage and/or monitor content-delivery to passengers across a fleet of airplanes. Managing and monitoring content-delivery in such an environment presents a number of challenges for traditional content-delivery systems. In particular, because airplanes often have inconsistent access to external networks while in flight (if they have access at all), traditional systems that heavily rely on consistent access to a central server for managing and/or monitoring content-delivery are generally ill-suited for such an environment. For example, traditional systems often rely on a central server to authenticate a user before content is provided to an end-user. As a result of this reliance, traditional systems often do not provide content when disconnected from the central server.

In contrast, the CDN 10b can manage and monitor content-delivery across a distributed network (e.g., across a fleet of airplanes capable of providing content to passengers) in which nodes that provide content to end-users (e.g., CDSs 40) often lack connection to external networks 112 and other nodes of the CDN 10b. The enhanced management and monitoring of content-delivery provided by the CDN 10b benefits a number of parties involved in the digital supply chain used to distribute multimedia content. For example, the CDN 10b enables content providers to structure more cost-effective licensing arrangements and to provide end-users with more content options than previously feasible.

The CDN 10b may include a network 112, content-delivery systems ("CDS") 140a-e, vehicles 130a-e, and a data center 171 including a CDN monitor 175.

1.02(a) Network 112

Generally speaking, the network 112 is a telecommunication network (or group of telecommunication networks) including (i) nodes and (ii) links used for data and/or communication exchange between various nodes. For example, one or more of the following may be nodes of the network 112 at various points in time, and may communicate when connected, directly or indirectly, with other nodes of the network 112: the vehicles 130a-e, the CDSs 140a-e, the consumer devices 160a-e, the data center 171, and the CDN monitor 175. The network 112 may be disposed, managed, and/or hosted, for the most part (if not entirely), externally to the vehicles 130a-e. As such, the network 112 may sometimes be referred to as an "external network."

[The external network 112 may be a combination of ground based and air-borne networks, such as an air-to-ground (ATG) communication network for aircraft use, or a mobile communication network for cellular or mobile phones and smart devices.

Further, the network 112 may include one or more public or private networks. For example, the network 112 may include a public "ground-based" network such as the Internet and/or the PSTN (Public Switched Telephone Network). Generally, phrases such as "ground network" and "ground computing device" refer to networks and computing devices that are not being transported by one of the vehicles 130a-e. Typical ground systems and ground computing devices may be essentially fixed in location, and may be contained in one or more buildings or structures fixedly attached to the ground.

In an embodiment, one or more of the vehicles 130a-e may be disconnected from the network 112 at a given time and thus may be unable to communicate with other nodes of the network 112 (e.g., the data center 171 or CDN monitor 175) at that time. For example, the vehicles 130a-e may periodically enter and exit "dark zones," resulting in intermittent connection to the network 112. To illustrate, the vehicle 130a, e.g., may lose connection to the network 112 when the vehicle 130a enters a "dark zone" (e.g., an area where the vehicle 130a cannot receive and/or transmit data to another node on the network 112). In such instances, the vehicle 130a and/or the CDS 140a may be said to operate in "autonomous mode." In some embodiments one or more of the vehicle 130a-e may maintain essentially persistent connection to the network 112, whether in-transit or not.

Regardless of frequency and length of connection, the vehicles 130a-e are generally configured to communicate via the network 112 (e.g., while in transit or while not in transit, such as when an airplane is in a hanger or at a terminal of an airport). In particular, the vehicles 130a-e may be communicatively connected to the network 112 via a CDS 140a-e. Alternatively or additionally, the vehicles 130a-e may include a communication system, independent from the CDSs 140a-e, for connection to the network 112. Once connected, the vehicles 130a-e may communicate with other nodes of the network 112, such as the data center 171, CDN monitor 175, or other of the vehicles 130a-e.

1.02(b) Vehicle 130a-e, CDSs 140a-e, and Consumer Devices 160a-e

Figure 3:
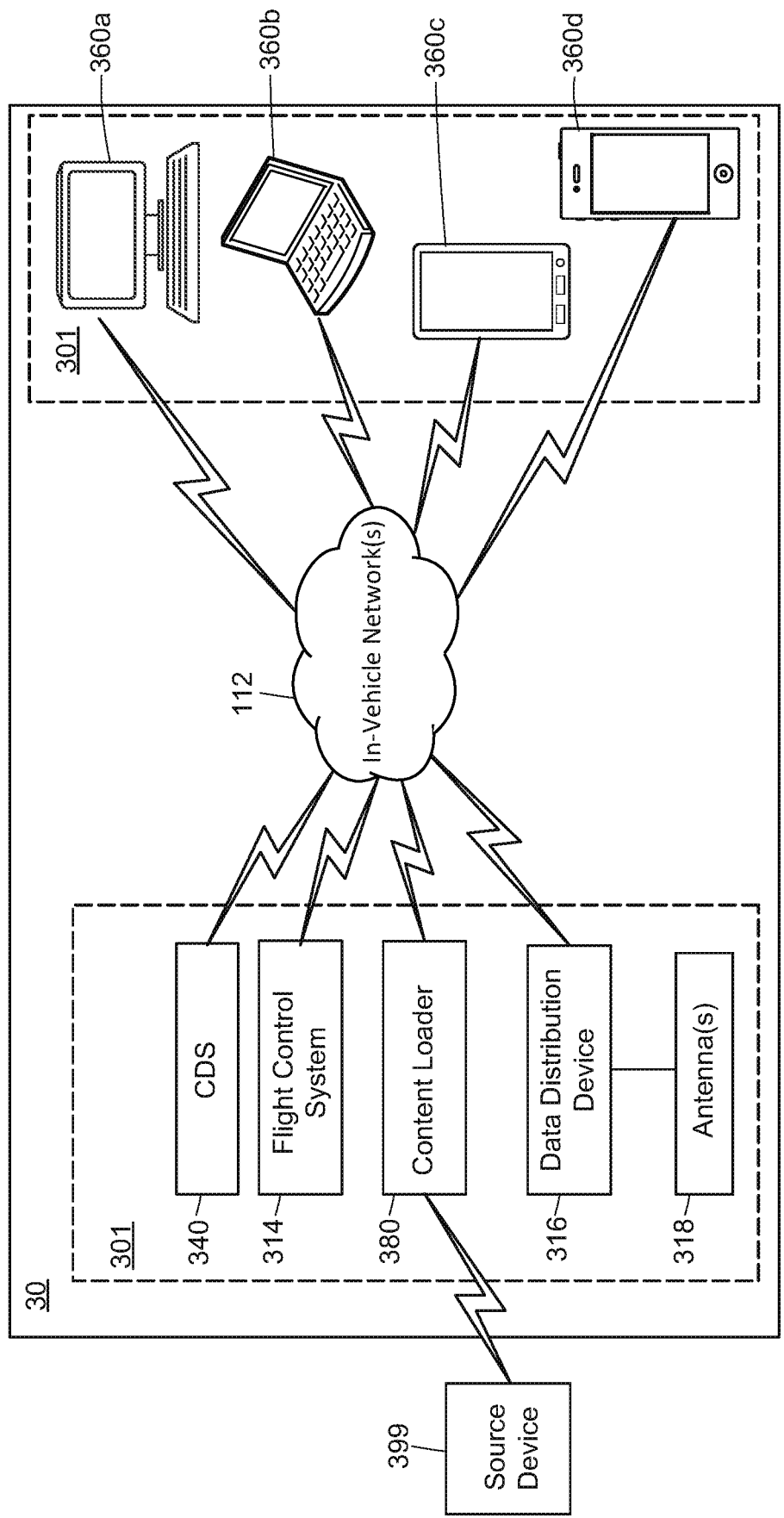
FIG. 3 illustrates an example vehicle according to an embodiment.
Figure 4:
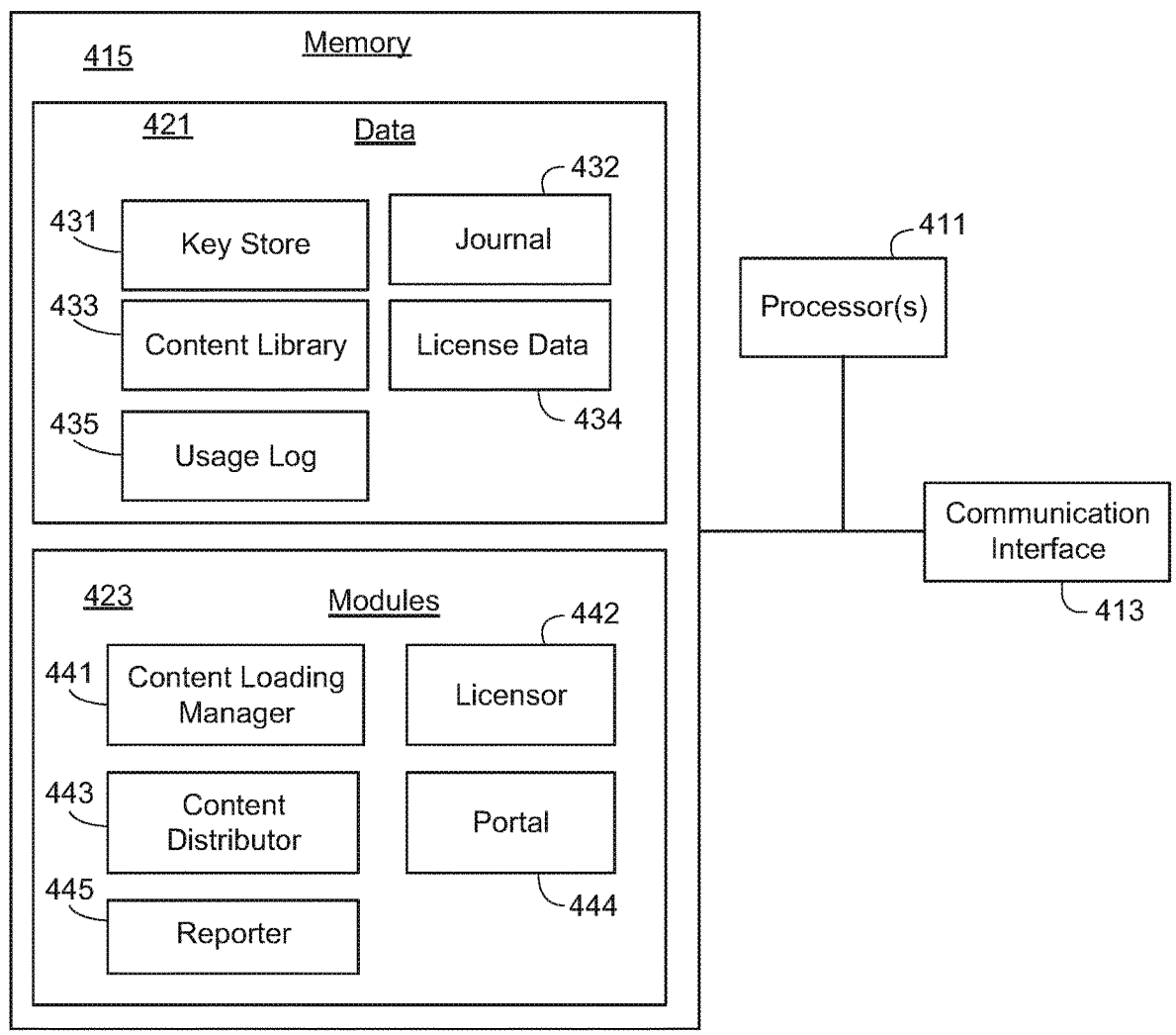
FIG. 4 illustrates an example CDS according to an embodiment.
Figure 6:
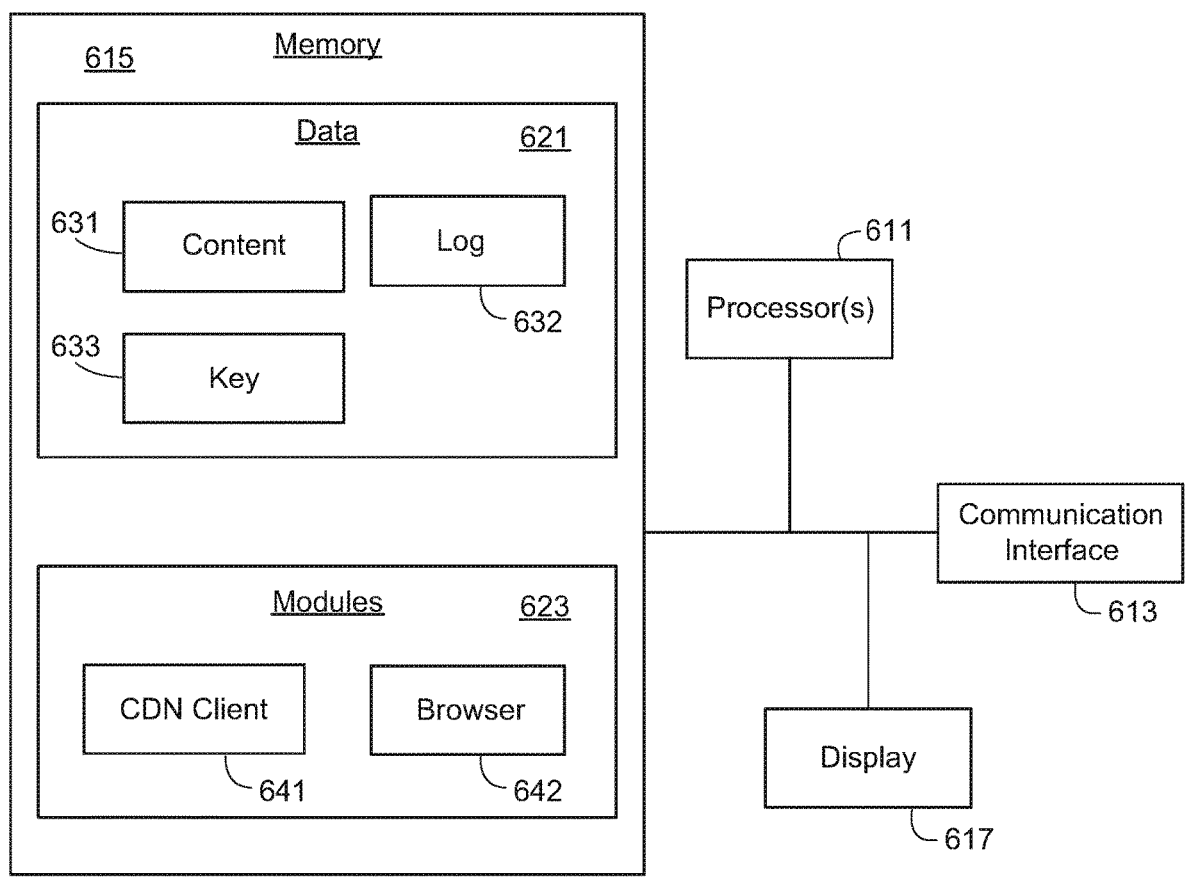
FIG. 6 illustrates an example content consumer device according to an embodiment.

The vehicles 130a-e may be similar to the vehicle 30 shown in FIG. 3; the CDSs 140a-e may be similar to the CDS 40 shown in FIG. 4; and the consumer devices 160a-e may be similar to the consumer device 60 shown in FIG. 6.

1.02(c) Data Center 171

The data center 171 (and the CDN monitor 175) may be communicatively coupled to the network 112 via the antennas 151, enabling communication between the data center 171 and one or more of the vehicles 130a-e, CDS 140a-e, and/or consumer devices 160a-e. As an example, the CDN monitor 175 may communicate with one or more of the vehicles 130a-e via the network 112.

The data center 175 may include systems that enable a content provider to (i) provide content to the CDSs 140a-e, (ii) provide keys for decrypting the content, and/or (iii) monitor content-delivery performed throughout the CDN 10B. Accordingly, the data center 171 may be communicatively connected to the CDSs 140a-e and various other systems by way of the antennas 151 and the network 112.

In an embodiment, the data center 171 includes the CDN monitor 175, which may be configured to monitor content distributed at each of the vehicles 130a-e. For example, the data center 171 may receive, via the network 112, a report of content delivery performed at the vehicle 130a. Based on the received report, the content delivery monitor 175 may update a log to include a record of the content delivery. The log may be similarly updated based on reports received from vehicles 130b-130e. Accordingly, the data center 171 may maintain a system-wide record of content delivery to consumer devices 160a-e at multiple vehicles 130a-e.

1.02(d) Example Operation of the CDN 10b

In operation, the CDN 10b may manage and/or monitor content-delivery to one or more of the consumer devices 160a-e at the vehicles 130a-e. In particular, multimedia content may be distributed to the vehicles 130a-e (e.g., by a system at the data center 171, or by a source device 399 shown in FIG. 3). The vehicles 130a-e may receive the multimedia content by way of the network 112, or by way of a direct connection to a source device 399. The vehicles 130a-e may deliver the content to consumer devices 160a-e and report the content-delivery by way of the network 112. Accordingly, the CDN 10b allows content providers to (i) deliver multimedia content to one or more consumer devices 160a-e, (ii) monitor the delivery of multimedia content to the consumer devices 160a-e, and/or (iii) log content-delivery performed by the CDN 10b.

In an embodiment, keys (e.g., DRM keys) are generated at the data center 171. The keys are then distributed to each of the vehicles 130a-e (e.g., when the vehicles are docked or stationed). In an embodiment, the keys may be stored at an SQL database. An InnoDB storage engine may be used for database transactions. As an example, an InnoDB storage engine may be used to commit or make certain database changes permanent, and/or to rollback or cancel certain database transactions. The database(s) at the data center 171 may include assets, asset keys, and policies. The database(s) may also include device keys and models, as well as portals and digital copy protection hashes.

In an embodiment, a CDN monitor 175 monitors content usage across the CDN 10b by tracking content-delivery performed by each of the CDSs 140. In an embodiment, the CDN monitor 175 collects access logs from each of the CDSs 140 reflecting content-delivery performed by the CDS 140 that maintained the access log. The CDSs 140 may transmit reports (e.g., on a periodic basis) generated based on an access log. The CDN monitor 175 may receive the reports and update a CDN log, based on the received reports, to track content-delivery performed at the vehicles 130. Some embodiments do not include a CDN monitor 175.

In some embodiments, the data center 171 includes a license server. In some instances, the license server tracks device models (e.g., phone models, tablet models, laptop computer models, etc.) The license server may rely on device model information to accept or reject a license request. Content may be encrypted against the license server, and keys (e.g., DRM keys) may be generated at the license server.

1.03 Example Method 180

Figure 1C:
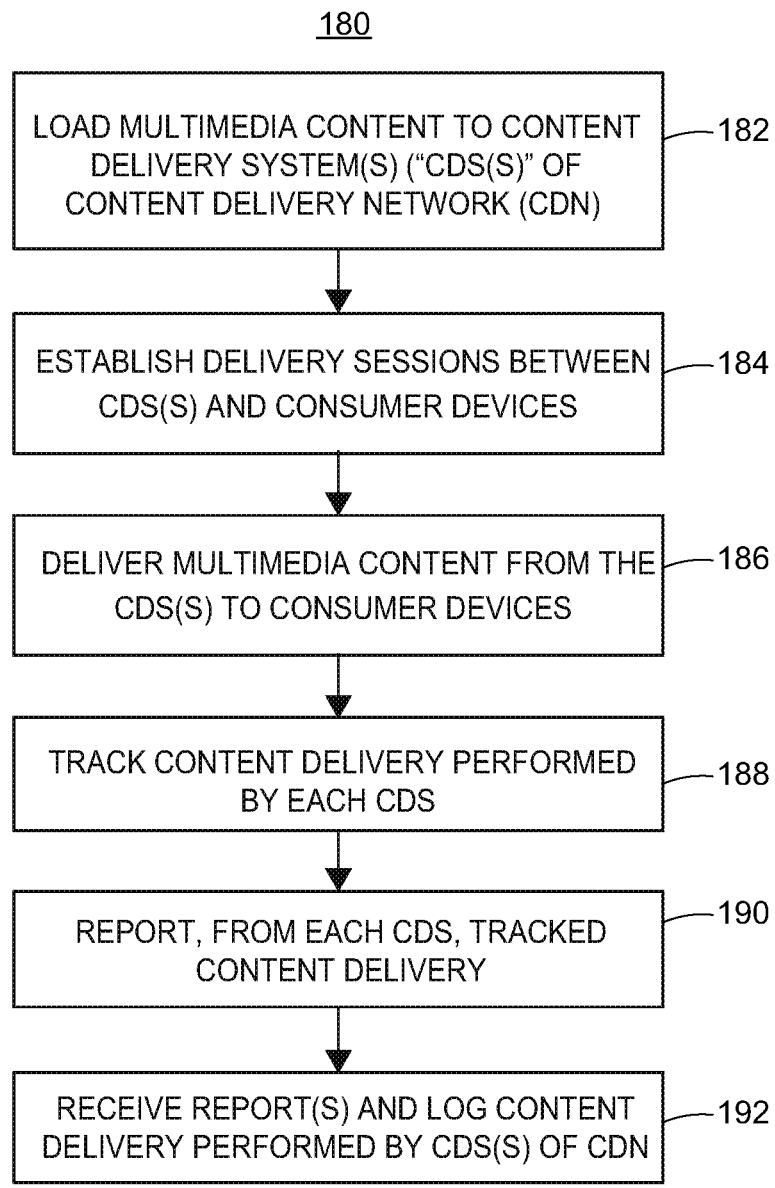
FIG. 1C illustrates an example method for managing and monitoring content-delivery by way of a CDN in accordance with the described embodiments.

FIG. 1C illustrates an example method 180 for managing and monitoring content delivery by way of a CDN in accordance with the described embodiments. The method 180 may be implemented, in whole or in part, by the CDN 10a (shown in FIG. 1A) or 10b (shown in FIG. 1B). The method 180 may be saved as a set of instructions, routines, programs, or modules at computer readable media found, for example, in memory devices at vehicles 130a-e, the CDSs 140a-e, and/or the data center 171 of the CDN 10b shown in FIG. 1B. While the method 180 is described with reference to the CDN 10b, method 180 may be implemented by other embodiments of the CDN not depicted in FIG. 1B.

Generally speaking, the CDN 10b may implement the method 180 to (i) deliver multimedia content to one or more consumer devices 160a-e using one or more CDSs 140a-e, (ii) monitor the delivery of multimedia content performed at the one or more CDSs 140a-e, and/or (iii) log content delivery performed by the one or more CDSs 140a-e in the CDN 10b.

The method 180 begins when multimedia content is distributed from the data center 171 to one of the vehicles 130a-e (block 182). In an embodiment, the content may be distributed via the one or more antennas 151 and the network 112. In an embodiment, the content may be distributed via electronic devices such as the source device 399 shown in FIG. 3. The following example focuses on vehicle 130a, CDS 140a, and consumer devices 160a for the sake of clarity, but similar operation may occur at the vehicles 130b-e, CDSs 140b-e, and consumer devices 160b-e.

The vehicle 130a receives the distributed content and may store the content at a memory device at the vehicle 130a.

The CDS 140a may establish a delivery sessions with one or more consumer devices 160a (block 184), during which the CDS 140a accesses the received content and distributes the content to appropriate consumer devices 160a (block 186). The CDS 140a may also distribute licenses or keys to the consumers 160a so that the consumers 160a can decrypt the content and provide the content to an end-user. Accordingly, the content can be securely delivered from the CDS 140a to the consumers 160a. Importantly, the CDN 10b enables passengers at the vehicle 130a, for example, to consume content via consumer devices 160a while in transit.

To track content delivery, the CDS 140a may generate or update a local record (e.g., at a memory device accessible at the vehicle 130a) of the content delivery performed by the CDS 140a (block 188). Each of the CDSs 140b-130e may similarly generate or update local records of content delivery.

To facilitate logging content delivery, the CDS 140a may report content delivery performed by the CDS 140a (block 190). In particular, the CDS 140a may transmit a "report" via the network 112. The report may be data or information relating to content delivery performed by the CDS 140a, and may be generated based on the aforementioned local record of tracked content delivery. For example, the report may include information identifying delivery sessions, users, consumer devices 160a-e, and/or particular piece(s) of content (e.g., a movie or song title, or unique identifier) that have been delivered.

With further reference to logging content delivery, the report transmitted by the CDS 140a may be received at the data center 171 (and in particular, at the CDN monitor 175) to be logged (block 192). The CDN monitor 175 may update a system-wide log to include a record of the content delivery associated with the report. Similar reports from any of the other vehicles 130a-e (e.g., transmitted by one of the CDSs 140a-e) may be received at the data center 171. Accordingly, the data center 171 may include a log of content delivered to one or more consumer devices 160a-e. In an embodiment, the log is a record of utilized keys. Consequently, CDN 10b may utilize the data center 171 to monitor content delivery performed at any and all of the vehicles 130a-e.

2. Example Content-Delivery Networks and CDSs

FIG. 2A-2E illustrate example CDSs and example content-delivery networks.

2.01 CDN 20a

Figure 2A:
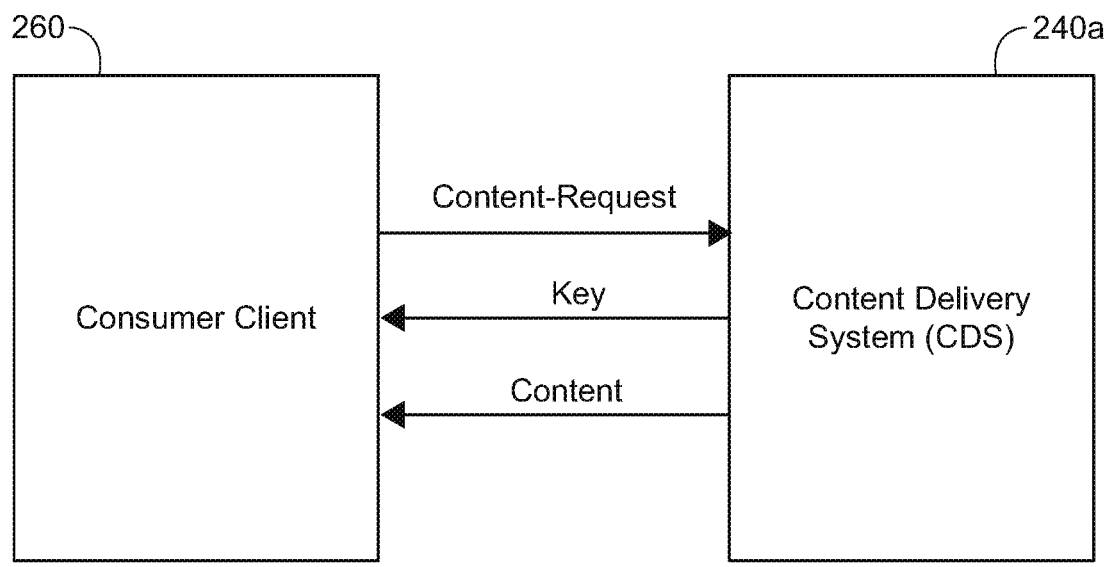
FIG. 2A illustrates an example CDS of a CDN according to an embodiment.

FIG. 2A illustrates an example CDS 240a of a CDN 20a according to an embodiment. In operation, a consumer device 260 transmits data representing a request for content (including, e.g., an identifier corresponding to a particular content title stored at the 240a). In response, the CDS 240a transmits the requested content (in whole or in part), in addition to a key for accessing content (e.g., a DRM key), to the consumer device 260. An example CDS, example content, and example key(s) are described in further detail with reference to FIG. 4. An example consumer is described in further detail with reference to FIG. 6.

2.02 CDN 20b

Figure 2B:
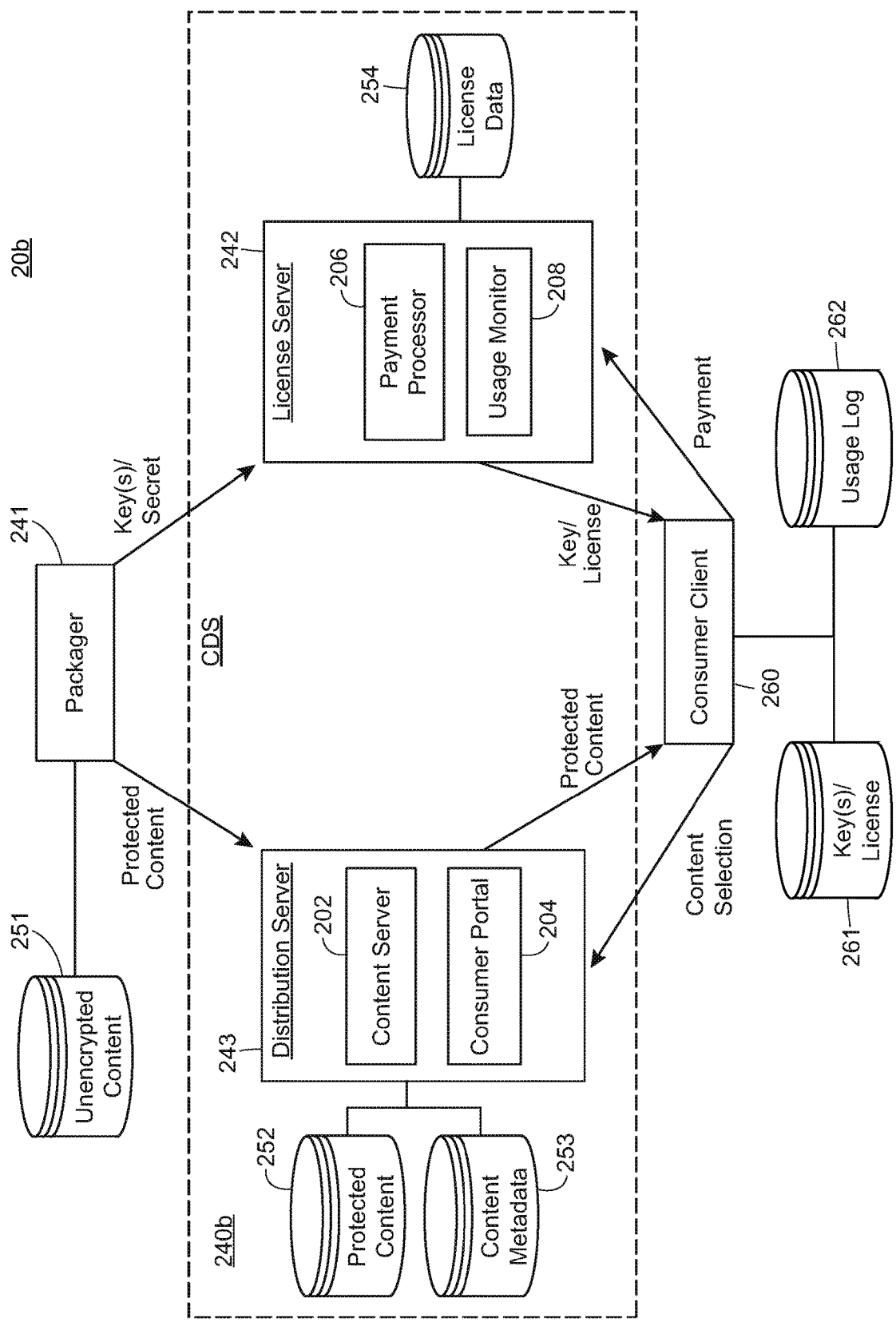
FIG. 2B illustrates an example CDN according to an embodiment.

FIG. 2B illustrates an example CDN 20b according to an embodiment. The CDN 20b may include a packager 241, a CDS 240b, and one or more consumer devices 260. The CDS 240b includes a licensing server ("licensor") 242 and a distribution server ("distributor") 243.

2.02(a) Packager 241

In example operation, the packager 241 (i) transmits protected content to the distributor 243 (where it may be stored as protected content 252) and (ii) transmits encryption information to the licensor 242. The distributor 243 may subsequently distribute the protected content 252 to one or more consumers 260, and the licensor 242 may transmit the encryption information (e.g., a key) to the consumer device 260 so that the consumer device 260 can access the protected content (e.g., for playback).

The packager 241 may utilize asymmetric or symmetric cryptography techniques protect the content. For symmetric cryptography, a single key is used to both encrypt and decrypt content. For example, the packager 241 may encrypt content utilizing a particular key. The encrypted content may subsequently be transmitted to the consumer device 260 (e.g., via the distributor 243), where the consumer device 260 utilizes the same key to decrypt the encrypted content. In such an example, the CDS 240b may transmit the key to the consumer device 60 (e.g., via the licensor 242).

For asymmetric cryptography, two or more distinct keys may be used. In an embodiment, the CDN 20b may utilize public-key encryption techniques. For example, the packager 241 may utilize a first key to encrypt content and the consumer device 260 may utilize a second key to decrypt the content. The first key (which may be referred to, e.g., as an "encryption key" and/or a "public key" in some instances) may be linked (e.g., mathematically) to the second key (which may be referred to, e.g., as a "decryption key" and/or "private key" in some instances). The first key may be generated so that anything encrypted with the first key may only be decrypted with the second key.

The packager 241 may receive or otherwise access unencrypted content 251. The packager 241 may encrypt the unencrypted content 251 to produce protected (i.e., encrypted) content, which is then transmitted to the distributor 243. The packager 241 may generate an encryption key.

In some embodiments, a key generator independent of the packager 241 generates such a key. In any event, the encryption key may be transmitted to the licensor 242 (e.g., by the packager 241).

In an embodiment, the packager 241 does not transmit an encryption key to the CDS 240b. In such an embodiment, the packager 241 may utilize a "shared secret" with the licensor 242 and/or consumer device 260. The shared secret may be a decryption key and/or a key-agreement protocol. The key agreement protocol may enable the licensor 242 and/or consumer device 260 to generate a decryption key.

2.02(b) Licensor 242

The licensor 242 is a computing system configured to authorize or refuse content-access for a consumer device 260. In particular, the licensor 242 may receive a request from the consumer device 260, and may issue a license or key to the consumer device 260 when appropriate (such as when a payment has been processed for the content at issue). In an embodiment, the licensor 242 may also be configured to monitor content usage by the consumer device 260. The licensor 242 may execute one or more modules to provide the functionality described herein, and may sometimes be referred to as a "license server."

The licensor 242 may include a memory device storing software modules, including a payment processor 206 and/or a usage monitor 208. The payment processor 206 handles financial transactions with the consumer device 260, and the usage monitor 208 monitors content accessed by one or more consumers 260. The usage monitor 208 may generate or update a usage log, such as the usage log 435 illustrated in FIG. 4, based on monitored content access. In an embodiment, the payment processor 206 and/or the usage monitor 208 may be modules or systems independent of the licensor 242. In such an embodiment, the licensor 242 may communicate via a network to invoke the payment processor 206 or the usage monitor 208.

In an embodiment, the licensor 242 may access license-data 254 stored at a memory device. The license-data 254 may include data representing one or more of: identities (e.g., corresponding to particular users and/or particular content consumer devices), a usage log to track content consumed by one or more consumers 260, cryptography keys, and/or records of access rights for one or more consumers 260. License-data is described in further detail with reference to FIG. 4.

In example operation, the licensor 242 may receive encryption information from the packager 241. The licensor 242 may store the encryption information, and may associate the encryption information with particular protected content 252. For example, licensor 242 may store a content item, or some other reference information associated with protected content 252, as being associated with the encryption information. Further, the licensor 242 may receive an access request from a consumer device 260. The licensor 242 may analyze the license data 254 to determine whether the requesting consumer device 260 is authorized to access protected content 252. If the license data 254 indicates that the consumer device 260 is authorized to access the license data 254, the licensor 242 may transmit a key to the consumer device 260 so that the consumer device 260 can decrypt some or all of the license data 254. In some instances, the licensor 242 may also transmit a license record to the consumer device 260. The license record may include information pertaining to the particular access rights that have been granted to the consumer device 260 or the user of the consumer device 260 (e.g., specifying certain content, time limits, download limits, etc.)

Accordingly, the licensor 242 may (i) receive an access request or license request from the consumer 260 for protected content 252, (ii) generate a license associated with the protected content 252, and/or (iii) transmit encryption information (e.g., a decryption key or keys) to the consumer 260 for the protected content 252. Generating the license may include updating the license-data 254 to include a record of new access rights granted to the consumer 260. In an embodiment, the licensor 242 calls the payment processor 206 after receiving a request, and transmits the encryption information after the payment processor 206 facilitates a successful purchase by the consumer 260 for the protected content 252. An example licensor and example access rights are described in more detail with reference to FIG. 4.

The licensor 242 may call the usage monitor 208 to track content consumed or accessed by the consumer 260. In an embodiment, the usage monitor 208 tracks content as it is delivered by the licensor 242. In an embodiment, the usage monitor 208 "audits" the consumer device 260. For example, the usage monitor 208 may cause the licensor 242 to transmit an audit request to the consumer device 260. In response, the consumer device 260 may transmit data from a local log to the licensor 242.

2.02(c) Distributor 243

The distributor 243 may include a content server 202 and/or a consumer portal 204, and may access protected content 252 and/or content metadata 253 stored at one or more memory devices.

In example operation, the distributor 243 receives the content metadata 252, directly or indirectly, from the packager 241 (e.g., via a communication interface) and stores the protected content 252 to memory. The distributor 243 may receive content metadata 253 included with or accompanying the protected content 252. Generally speaking, the content metadata 253 includes data describing the protected content 252. For example, for a particular file in the protected content 252 (e.g., a video file), the content metadata 253 may identify a title, file path, file type, file size, codec, or other information about the file.

The content server 202 transmits protected content 252 to the consumer device 260. The consumer portal 204 is a service or module that provides an interface, via a network, to the consumer device 260, enabling the consumer device 260 to select content and/or purchase content. An example portal is described in more detail with reference to FIG. 4.

In an embodiment, a content-loader device receives the protected content 252 (directly or indirectly) from the packager 241, and stores the protected content 252 at a memory device accessible to the distributor 243. An example content-loader is described in further detail with reference to FIG. 4.

2.03 CDN 20c

Figure 2C:
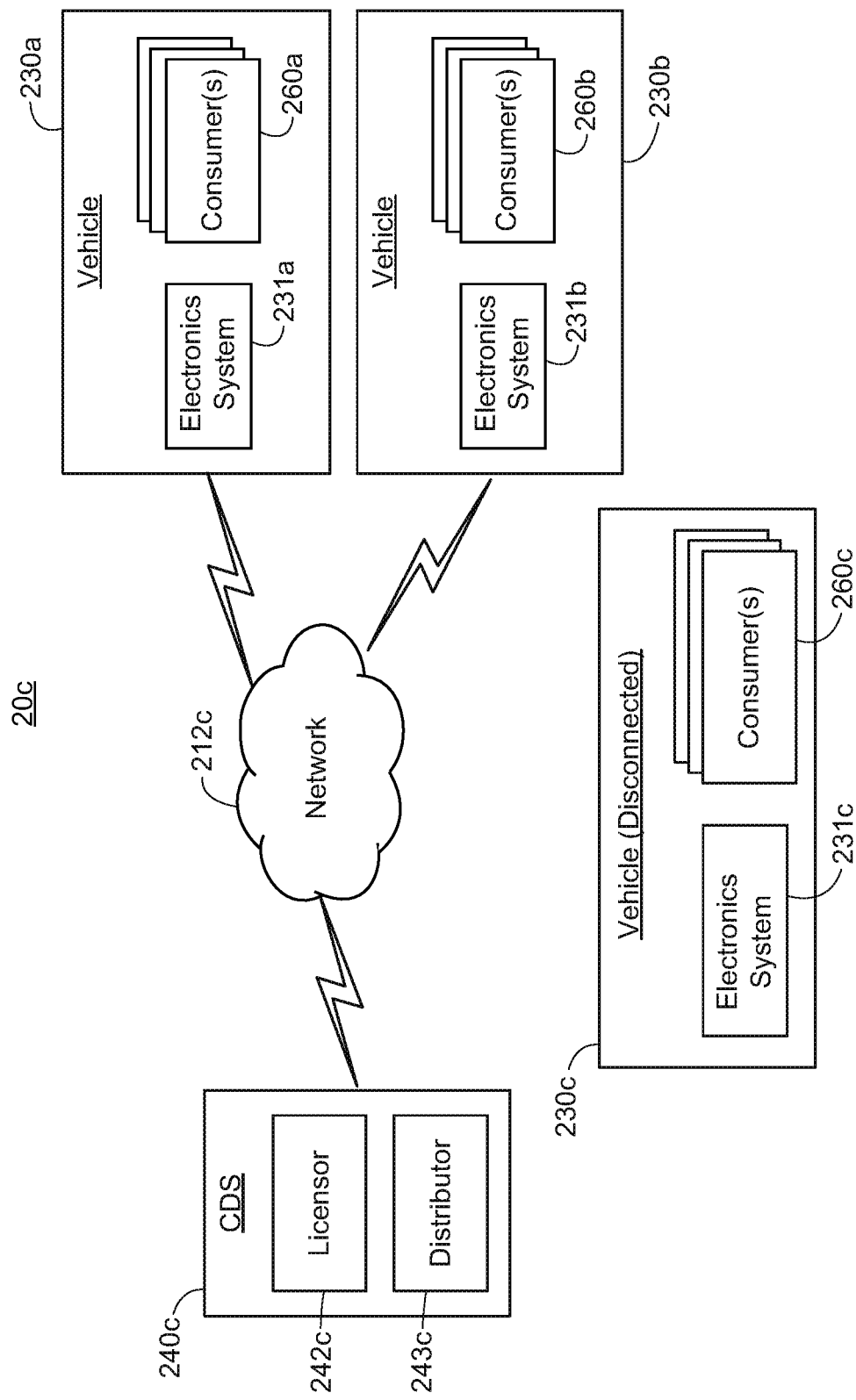
FIG. 2C illustrates an example CDN according to an embodiment.

FIG. 2C illustrates an example CDN 20c according to an embodiment. The CDN 20c may be referred to as a CDN with a centralized CDS. The CDN 20c includes a CDS 240c, a vehicle 230a, a vehicle 230b, and a vehicle 230c. Each of the vehicle 230a-c includes (i) corresponding electronics system 231a-c, and (ii) corresponding consumer device(s) 260a-c. In example operation, the CDS 240c handles content requests from each of the vehicles 230a-c, and may deliver content to each of the vehicles 230a-e (e.g., via the network 212 and the electronics systems 231a-c of the vehicles).

In some instances, one of the vehicles 230a-c may be disconnected from the network 212c. As illustrated, vehicle 230c is disconnected. In this state, the consumer device(s) 260c cannot communicate with the CDS 240c, and thus cannot request or receive content until reconnected to the network 212. Further, while in this state the vehicle 230c and/or the CDS 240c may be said to be operating in "autonomous mode." When in autonomous mode, a consumer device(s) 260c will generally be limited to consuming content that has already been downloaded to the consumer device(s) 260c. In other words, the vehicle 230c may provide no other mechanism for delivering content to the consumer device(s) 260c.

In some instances, when in autonomous mode the consumer device(s) 260c may even be limited from consuming content already downloaded. For example, in some embodiments the consumer device(s) 260c may include a client that will only play downloaded content upon receiving authorization from the CDS 240c (or from another system connected to the network 212). If authorization is required from an external license server, for example, the consumer device(s) 260c may not be able to provide some content to end-users while the CDS 240c is in autonomous mode.

2.04 CDN 20d

Figure 2D:
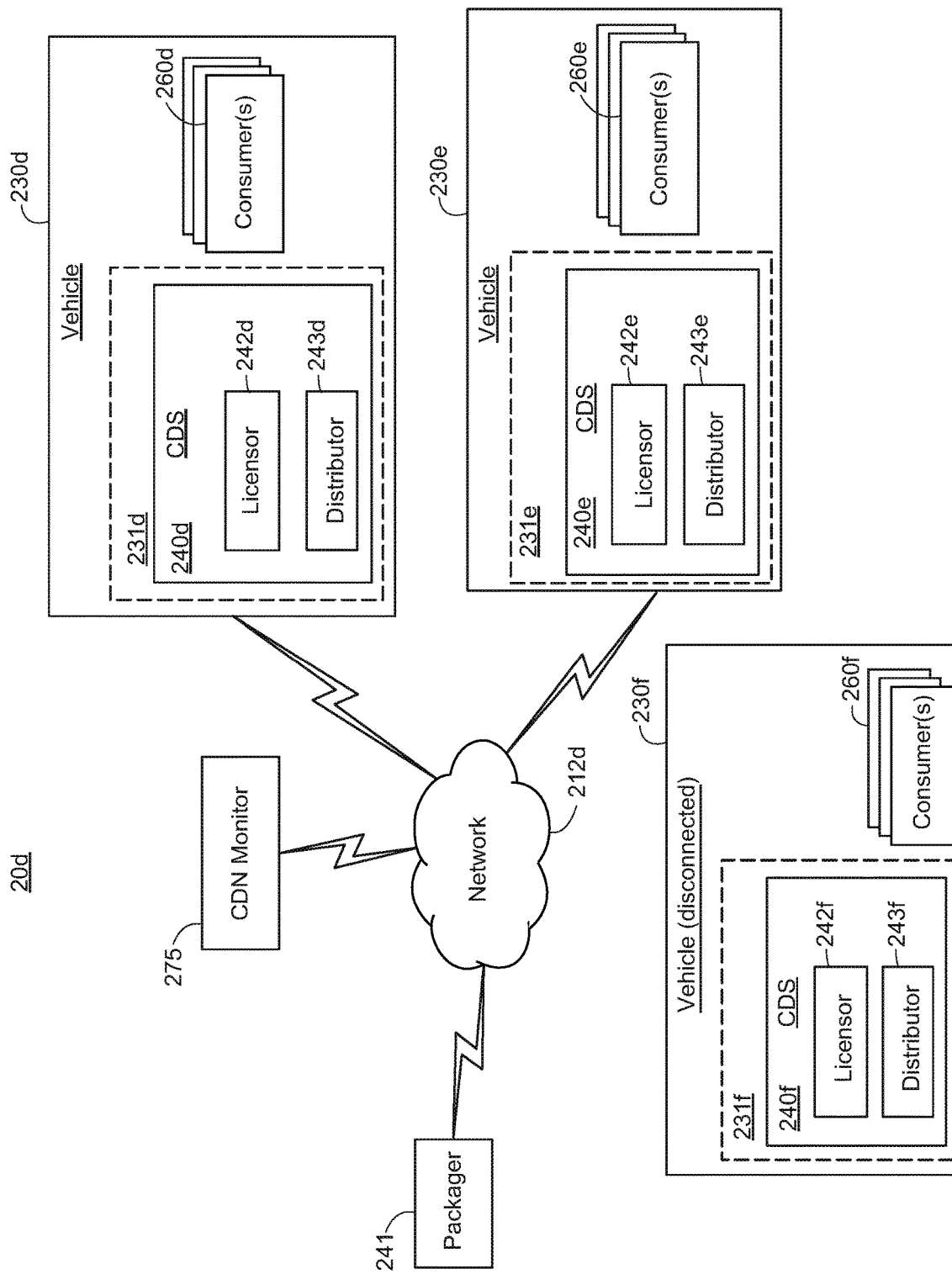
FIG. 2D illustrates an example CDN according to an embodiment.

FIG. 2D illustrates an example CDN 20d according to an embodiment. The CDN 20d may be referred to as a CDN with a distributed CDS. The CDN 20d includes multiple CDSs 240d-f (similar to the CDS 40 shown in FIG. 4), a packager 241, and a CDN monitor 275; each of which may communicate via a network 212d (similar to network 112 shown in FIG. 1) with one or more other nodes connected to the network 212d. The CDSs 240d-f include licensors 242d-f and distributors 243d-f (e.g., which may be similar to the licensor 242 and distributor 243 shown in FIG. 2B).

The packager 241 may be located at the data center 171 shown in FIG. 1. In example operation, the packager 241 protects content-data (e.g., via encryption) that is to be distributed to the CDSs 240d-f. In an embodiment, the packager 241 transmits the protected content-data to the CDSs 240d-f via the network 212d.

In some instances, the packager 241 is not connected to the network 212d. For example, the protected content may be loaded to an uploading device to distribute the protected content to one or more of the vehicles 230d-f. An example uploading device (referred to as a source device 399) is described with reference to FIG. 3. The uploading device may load the protected content to the appropriate vehicle 230d-f (e.g., via the source device 399 shown in FIG. 3).

Typically, the CDSs 240d-f are installed or otherwise disposed at vehicles 230d-f. In particular, the CDSs 240d-f may be part of the communications systems or electronics systems 231d-f of the vehicles 230d-f. In example operation, each of the CDSs 240d-f may receive content from a content-loader and/or from the data center 171 shown in FIG. 1, and may provide the content to consumer device(s) 260d-f. Accordingly, the CDN 20d enables passengers onboard or proximate to the vehicles 230d-f to consume content (e.g., while in transit) by establishing communication with the electronics system 231d-f of the vehicle 230d-f.

In the illustrated embodiment, vehicle 230f is disconnected from the network 212d. Despite being disconnected from the network 212d, the vehicle 230f may distribute content to the consumer device(s) 260f. Because the CDS 240f is disposed at the vehicle 230f, the consumer device(s) 260f can receive content even when the vehicle 230f is disconnected from external networks. While the content selection may be limited to content previously loaded to the vehicle 230f (e.g., content loaded via a content-loader device and/or via the network 212d) when in a disconnected state, the consumer device(s) 260f may maintain access to a content library on-board the vehicle 230f via the CDS 240f.

The CDN monitor 275 may be located at the data center 171 shown in FIG. 1. In example operation, the CDN monitor 275 receives records or reports from the vehicles 230d-230f regarding content-delivery performed at each of the vehicles. Example embodiments and operation of a CDN monitor are discussed in further detail with reference to FIG. 1B.

2.05 CDN 20e

Figure 2E:
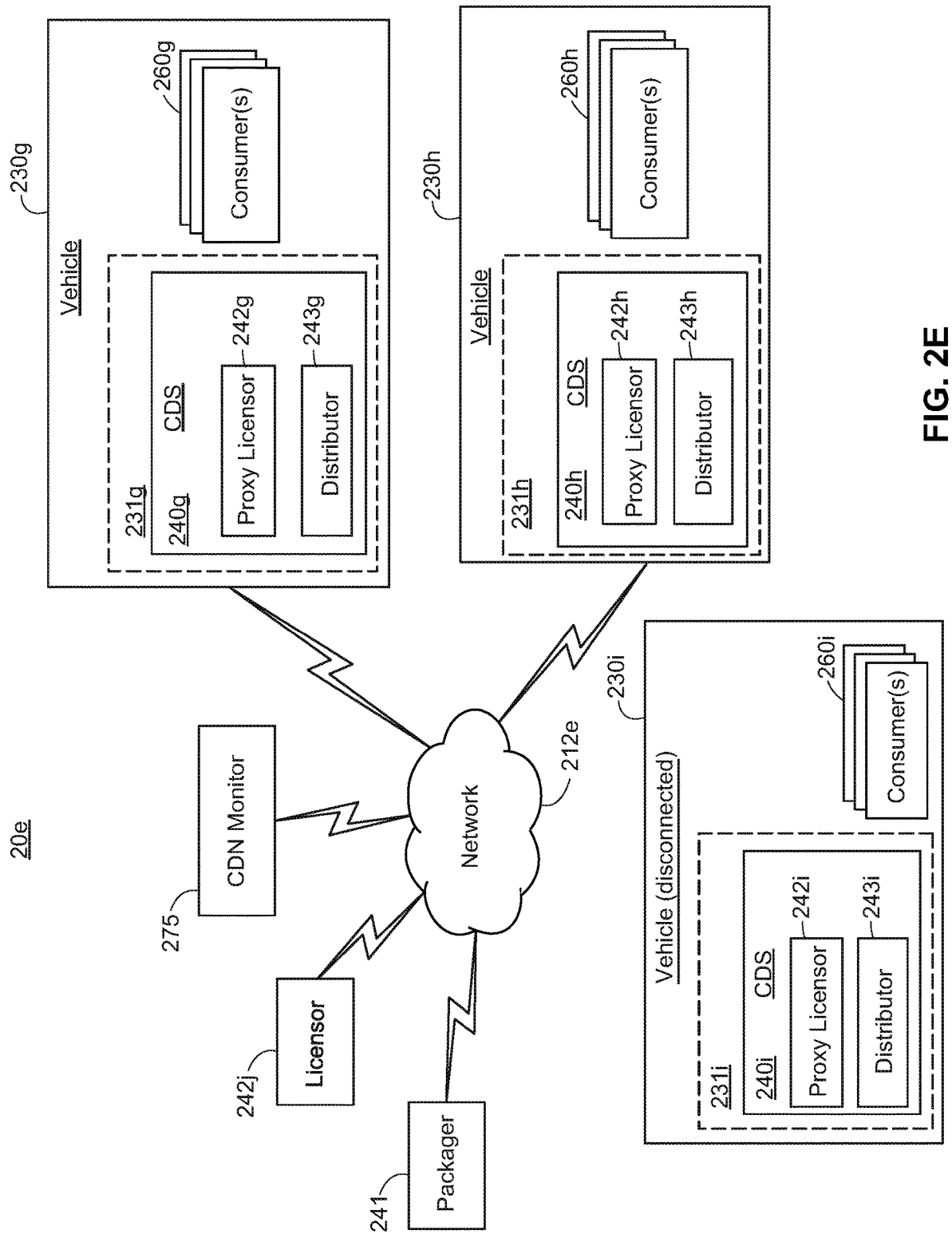
FIG. 2E illustrates an example CDN according to an embodiment.

FIG. 2E illustrates an example CDN 20e according to an embodiment. The CDN 20e includes a network 212e (similar to the network 112 shown in FIG. 1) and vehicles 230g-i (similar to the vehicle 30 shown in FIG. 3). The CDN 20e also includes a packager 241, licensor 242j (similar in certain respects to the licensor 242 shown in FIG. 2B), and a CDN monitor 275, one or more of which may be disposed at the data center 171 shown in FIG. 1, and one or more of which may be communicatively connected to the network 212e at various times. An example packager and licensor are described in more detail with reference to FIG. 2B. The CDN 20e further includes CDSs 240g-i (similar to the CDS 40 shown in FIG. 4).

The licensor 242j may access license-data stored at a memory device (example license-data is described in more detail with reference to FIG. 2B). In particular, the licensor 242j may manage a key-store including keys that are distributed to each of the vehicles 230g-i. Each of the CDSs 240g-i at the vehicles may locally manage the set of keys received from the licensor 242j. For example, each of the CDSs 240g-i may handle authorization verification operations with respect to consumers requesting content access. If one of the CDSs 240g-i determines that a particular consumer is authorized to access requested content, the CDS may transmit an appropriate key (from the set of keys received from the licensor 242j) so that the consumer can decrypt content (which is generally also provided by the CDS) and provide the content (e.g., via a display and/or speakers).

Each of the vehicles 230g-i includes communication systems 231g-i and consumers 260g-i. Example electronics and communication systems are described in further detail with reference to FIG. 3. Each of the communications system 231g-i includes a corresponding CDS 240g-i.

Each CDS 240g-i includes a proxy licensor 242g-i (similar in certain respects to the licensor 242 shown in FIG. 2B) and a distributor 243g-i (similar to the distributor 243 shown in FIG. 2B). Each proxy licensor 242g-i may act as an intermediary between the licensor 242j and the respective consumers 260g-i to which the proxy licensor 242g-i is connected. In an embodiment, the proxy licensors 242g-i may operate in place of the licensor 242j, for example, when the CDS 240i and/or the vehicle 230i is disconnected from the network 212e (which may occur, e.g., when the vehicle 230i is operating in autonomous mode). In other words, the proxy licensors 242g-i may provide, to the content consumers 260g-i, keys for accessing content, even when operating in autonomous mode. Further, when the 240f establishes or reestablishes connection to the licensor 242j via the network 212e, the licensor 242j may load keys to the vehicle 230i and/or may monitor key usage at the vehicle 230i.

In short, the proxy licensor 242i may receive access requests, verify authorization for requested access to content, handle payment processing (e.g., by invoking the payment processor 206 shown in FIG. 2B), transmit licenses or decryption keys to the requesting consumer device 260i so that the consumer device 260i can decrypt and display protected content, and/or synchronize with the licensor 242j when communication is possible.

In example operation, content-data may be loaded to the vehicle 230*i*. The licensor 242*j* may transfer (directly or indirectly) license-data, associated with the content-data, to the proxy licensor 242*i*. The proxy licensor 242*i* may manage access rights for the loaded content-data on-board the vehicle 230*i*, and may issue keys and/or licenses to the appropriate content consumers 260*g-i*. The issued keys are typically keys selected from a set of keys received (directly or indirectly) from the licensor 242*j*. Importantly, the proxy licensor 242*g-i* does not require connection to the licensor 242*j* in order to issue keys. Accordingly, the proxy licensors 242*g-i* enable content consumers 260*g-i* to receive licenses and/or keys, even when disconnected from the licensor 242*j*, for decrypting and displaying protected content.

In some instances, the proxy licensor 242*i* may be synchronized to the licensor 242*j* when connection to the licensor 242*j* has been reestablished (e.g., via the network 212*e*). Such synchronization may include transmitting (e.g., via a communication interface of the CDS 240*i* and/or via some other communication system 231*i* of the vehicle 230*i*) payment information from the proxy licensor 242*i* to the licensor 242*j*. In certain instances, the licensor 242*j* may verify the legitimacy of the payment information.

For example, payments often cannot be processed while the vehicle 230*i* operates in autonomous mode, because payments typically require interaction with third party systems that require broader network access (e.g., internet access). Accordingly, the proxy licensor 242*i* may collect payment information from consumers 260*i*, which is later transmitted to the licensor 242*j* so that the licensor 242*j* can process the payment. In some instances, the licensor 242*j* may be unsuccessful in processing such payment information (e.g., a credit card may be expired or overdrawn). In such instances, the licensor 242*j* may transmit a signal to the proxy licensor 242*i* indicating that the payment verification failed. In such a scenario, the CDS 240*i* may stop transmitting content to the appropriate consumer device 260*i* in response to receiving the signal.

Depending on the embodiment, the licensor 242*j* may establish a wired or wireless connection to the network 212*e* during the synchronization process. Further, such a connection may be established while in-flight (e.g., via an air-to-ground connection or an air-to-satellite connection) or while not in-flight (e.g., while stationed). For example, a communication link may be established when the vehicle is stationed at a port (e.g., airport) that includes networking equipment (e.g., a router) for a wired or wireless communication. In other instances, synchronization may occur without connection via the network 212*e*. For example, an intermediary device (e.g., a USB device) may be utilized to "unload" synchronization information from the vehicle 230*i* and to load the synchronization information to the licensor 242*j*. Such synchronization information may include payment information as previously mentioned, as well as various reports or journals that identify used keys, used key counts, or any other record of content-delivery that occurred while the vehicle 230*i* operated in autonomous mode.

In sum, the CDN 20*e* enables both (i) centralized key-management and content usage tracking, and (ii) distributed key-management and content-usage tracking. In short, the CDN CDN 20*e* includes a collection of CDSs that can each not only independently deliver content to content consumers, but can independently and securely control and manage content access. That is, the CDSs of the CDN 20*e* can implement secure, protected content-delivery without connection to a centralized license server or DRM system. By delivering content without relying on a central server (e.g., while in autonomous mode), the CDN 20*e* enables content-providers to deliver content to consumer devices without interruption of service, e.g., when access to the network 212*e* is lost. Further, by synchronizing the CDSs with the licensor 242*j* (e.g., when access to the network 212*e* is reestablished), the CDN 20*e* enables centralized key-management and content usage tracking.

3. An Example Vehicle 30

FIG. 3 illustrates an example vehicle 30 according to an embodiment. In example operation, the vehicle 30 may receive content from a source device 399 via the network 112 or via a direct connection to the source device 399. The vehicle 30 may provide the received content to passengers on-board or proximate to the vehicle 30 (e.g., while in transit).

3.01 Vehicle 30 Overview

Generally speaking, the vehicle 30 is a machine capable of conveying cargo or passengers from one location to another. The vehicle 30 may be used to transport passengers who pay for, or are otherwise granted, passage on the vehicle 30. The owner or operator of the vehicle 30 may be an individual or some other entity, such as a business entity or governmental entity. In some embodiments, the vehicle 30 may be one of a fleet of vehicles and/or may be used to transport live or inanimate cargo, packages, mail, and/or other types of passengers or cargo.

In an embodiment, the vehicle 30 may be an aircraft. The vehicle 30 may be configured for travel by land, sea, air, or some combination thereof. For example, in some embodiments the vehicle 30 may be similar to one or more of the vehicles 130*a-e* illustrated in FIG. 1. To illustrate, the vehicle 30 may be an aircraft, a bus, a train, or a watercraft. Regardless of the exact mode of transportation provided by the vehicle 30, the vehicle 30 may generally be used and/or configured for content delivery purposes.

In particular, the vehicle 30 may be owned or operated by a content provider (e.g., a content owner), or by an entity that has contracted with a content provider to give the vehicle 30 content delivery capabilities. For example, the vehicle 30 may be a commercial passenger airplane owned or leased by an airline company, and the airline company may be a content provider (e.g., the airline may license content and provide the content to the passengers). With further reference to the previous example, the airline may not be a content provider, but may cooperate with a content provider that provides equipment, services, licenses, and/or content to facilitate content delivery to passengers on airplanes operated by the airline. While this example described aircraft, the vehicle 30 may be any type of vehicle, depending on the embodiment. Regardless of the precise design of the vehicle 30, the vehicle 30 may be communicatively connected to one or more networks 112 (described in detail with reference to FIG. 1). Further, the vehicle 30 includes systems or devices that enable the vehicle 30 to provide multimedia content to passengers.

3.01(a) Electronics Systems 301

The vehicle 30 may include electronic systems or devices 301, one or more of which may communicate via an in-vehicle network 312. One or more of the electronics systems 301 may be communicatively connected to other of the electronics systems 301. Similarly, one or more of the electronics system 301 may be communicatively connected to systems or devices that are coupled to the networks 112.

The electronics systems 301 may include traditional avionics systems (or equivalents for non-aircraft vehicles), such as communication systems, navigation systems, instrumentation, flight-control systems, or collision avoidance systems. The electronics system 301 may also include non-avionics systems (e.g., electronics not specifically designed for use in an aircraft). In an embodiment, the electronics systems 301 includes a control system 314, a data distribution device 316, an antenna 318, a CDS 340 (each of which may be communicatively connected to the network 112), and consumer devices 360*a-d*.

As many of the electronics systems 301 may require a degree of stability or secure attachment during transportation, at least some of the electronics systems 301 may be included in a line-replaceable-unit (LRU) that is fixedly or rigidly attached to the vehicle 30. Typically, an LRU is an electronic assembly that performs a specific function in the vehicle 30 and may be removed or replaced as a unit and serviced at a vehicle maintenance center. For example, in an embodiment, the control system 314, the data distribution device 316, an antenna 318, and/or the CDS 340 may be provided in respective LRUs. Of course, other types of devices transported by the vehicle 30 may be provided in respective LRUs.

Some of the electronics systems 301 may not be included in LRUs. For example, instead of being fixedly connected to the vehicle 30 via LRUs, some electronics systems 301 may be fixedly connected to the vehicle 30 using some other means, such as a bracket or other connecting device. Further, some electronics systems 301 may not be fixedly or rigidly attached to the vehicle 30 at all. For example, consumer devices (e.g., tablet, laptop, cell phone, smart device, etc.) of passengers or crew members on the vehicle 30 may not be fixedly or rigidly attached to the vehicle 30.

3.01(b) In-Vehicle Network(s) 312

Generally speaking, the in-vehicle network 312 is a telecommunication network or group of networks disposed, managed, and/or hosted on-board the vehicle 30. The in-vehicle network 312 may include various nodes and links used for data and/or communication exchange between the nodes. In an embodiment, nodes of the in-vehicle network 312 may also communicate with nodes outside of the in-vehicle network 312 (via, e.g., the network 112). The in-vehicle network 312 may include one or more of: a wired network, a wireless network, or a network that uses a combination of wired and wireless technology. Further, the in-vehicle network 312 may include a public or a private network.

In an embodiment, the in-vehicle network 312 includes one or more access points that allow some or all of the electronics systems 301 to connect to the in-vehicle network 312. For example, the in-vehicle network 312 may include networking equipment such as routers, hubs, switches, repeaters, bridges, and/or gateway devices. Some of the networking equipment may utilize a spread spectrum paradigm and/or one or more RF bands (e.g., an ISM band, such as the 900 MHz band, 2.4 GHz band or 5 GHz band) to facilitate communication. As another example, the networking equipment may include a power control segment to regulate power output from devices such as the consumer devices 360*a-e*.

The in-vehicle network 312 may include a personal area network (PAN) and/or a local area network (LAN), either of which may be wired or wireless in nature. For example, the in-vehicle network 312 may include a wireless LAN such as a Wi-Fi network. As another example, the in-vehicle network 312 may include an ARINC (Aeronautical Radio, Incorporated) 429 network for routing and delivering avionics data. Other examples of in-vehicle network 312 may include a wired Ethernet network (e.g., which may be used for delivering maps and other cockpit data).

The in-vehicle network 312 may utilize any known communication protocol or combinations thereof, such as a wireless protocol, a wired protocol, other ARINC standard-compatible protocols, or a private protocol. In an embodiment, various nodes transported by the vehicle 30 and various nodes external to the vehicle 30 may discover one another, and may publish services and subscribe to services, using the in-vehicle network 312 and/or the network 112.

3.01(c) Control System 314

The control system 314 may collect information from various sensors and/or instruments (e.g., for position sensing, force measurement, and/or pressure sensing). The control system 314 may then provide collected information (e.g., altitude, airspeed, aircraft position, or other flight state information) to nodes of the in-vehicle network 312 or network 112. In an embodiment, various nodes of the network 112 (e.g., at the data center 171) may receive the collected information. In an embodiment, one or more components of the flight control system 314 may be included in an LRU. Such an LRU may be responsible for collecting information from the various flight sensors and/or instruments.

3.01(d) Data Distribution Device 316 & Antennas 318

Generally speaking, the data distribution device 316 is a computing device that functions as an interface between the in-vehicle network 312 and networks external to the vehicle 30, such as the network 112. Accordingly, the data distribution device 316 may enable nodes of the in-vehicle network 312 (e.g., a consumer device 360) to communicate with nodes of the network 112 (e.g., the data center 171). The data distribution device 316 may be communicatively coupled to one or more antennas 318.

The antennas 318 may enable air-to-air communication with other vehicles (e.g., any of the vehicles 130*a-e* shown in FIG. 1). Alternatively or additionally, one or more of the antennas 318 may enable air-to-ground communication. The antennas may enable communication via a cell site or via a satellite communication system. A cell site is a location where antennas and electronic communications equipment are placed to create a cell in a cellular network. In an embodiment, the antenna 318 enables communication via the network 112.

The data distribution device 316 may include interfaces that enable data exchange with devices and systems external to the vehicle. In an embodiment, the interfaces of the data distribution device 316 may be fixedly coupled to the vehicle 30, and/or may be included in one or more Line-Replaceable Units (LRUs). In some embodiments, the data distribution device 316 itself may be a single LRU or multiple LRUs.

3.01(e) CDS 340

The CDS 340 may be similar to the CDS 40 shown in FIG. 4. The CDS 340 may receive content (e.g., from the content-loader 380 or from the data center 171 shown in FIG. 1) and store content at a memory device on-board the vehicle 30. The content may be loaded to the vehicle 30 via wireless communication links or via wired communication links, depending on the embodiment.

The content stored at the CDS 340 may be updated using a common messaging protocol. For example, a node at the data center 171 may publish, via the network 112 to the vehicle 30, a content update service. The CDS 340 may subscribe to the content update service, and may receive updated content via the network 112 while the vehicle 30 is in transit (e.g., when in flight) or while the vehicle 30 is not in transit (e.g., when parked at a terminal).

In an embodiment, the content may be updated via non-wireless methods. For example, one of the electronics system 301 may be connected to the content-loader 380, which may include an interface for establishing a physical connection (e.g., via USB cable or plug) to receive content updates, which are then transmitted to a memory accessible by the CDS 340. In an embodiment, the content-loader 380 is component of the CDS 340. In some embodiments, the content-loader 380 is a component separate from the CDS 340.

In an embodiment, the CDS 340 may publish content (e.g., a movie, entertainment or media service) for passengers on board the vehicle 30 via the in-vehicle network 312. For example, in an embodiment the CDS 340 may wirelessly stream content via the in-vehicle network 312 to the consumer device 360a. An example CDS is described in more detail with reference to FIG. 4.

3.01(f) Consumer Devices 360a-d

The consumer devices 360a-e may be similar to the consumer device 60 shown in FIG. 6. In an embodiment, the consumer devices 360a-d may discover (e.g., using a common messaging protocol) the CDS 340 (and any published entertainment/content services) via the wireless network 312. In an embodiment, the consumer devices 360a-d may subscribe to the service so that users of the devices may select content (e.g., movies and other digital media) to consume. The consumer devices 360a-e may receive content transmitted from the CDS 340, where the consumer device 360a-e may display the content (e.g., by playing a video). An example consumer device is described in further detail with reference to FIG. 6.

3.01(g) Source Device 399

The source device 399 is an electronic device utilized to load content to the vehicle 30. The source device 399 may be a data storage device (e.g., including flash memory) with a communication interface for establishing a connection with a device at the vehicle 30 (e.g., the content-loader 380 or the CDS 340). The communication interface of the content-loader 399 may facilitate a physical link (e.g., via a universal serial bus port) with the vehicle 30. In other instances, the communication interface may enable wireless communication with the vehicle 30.

For example, various short-range wireless technologies (e.g., Bluetooth protocols, Near Field Communication protocols, etc.) or non-short-range wireless technologies may be utilized, depending on the embodiment. In some embodiments the content-loader 399 and vehicle 30 are directly connected (e.g., via a point-to-point connection or a bus connection). In some instances, the content-loader 399 and vehicle 30 may be connected via a network including other devices (e.g., via a wireless network with a star, mesh, ring, hybrid, or some other topology). Regardless of the exact nature of the connection, the content-loader 399 may connect to the vehicle 30 to load content to the vehicle 30.

The content-loader 380 is device with an interface capable of establishing a communication link with another device or system (generally for the purpose of receiving content to be loaded to the vehicle 30). For example, the content-loader 380 may include an interface for establishing a wired or wireless communication link with a source device 399. Multimedia content may be transferred from the source device 399 to the content-loader 380 via the established link. The content-loader 380 provides the received content to the CDS 340 by storing the received content at a memory on the vehicle 30 or by transmitting the received content to the CDS 340. The content-loader 380 may be communicatively connected to the CDS 340 via the in-vehicle network 312 (e.g., via one or more buses or wireless links).

The content-loader 380 may include a physical interface, such as a USB interface, that is utilized by source devices 399 (i.e., devices transmitting content-data to the content-loader 380) to load content to the vehicle 30. As an example, the source device 399 may be a USB memory stick in an embodiment. In some embodiments, the content-loader 380 may alternatively or additionally include a wireless interface that the source device 399 can utilize for loading content to the vehicle 30. Interactions between an example content-loader and an example CDS are described in detail with reference to FIG. 4.

During a content loading procedure, a source device 399 may be communicatively connected to the content-loader 380 (which may be part of an LRU). The source device 399 may be "plugged in" to a port of the content-loader 380. In some instances, a wireless communication link is established between the source device 399 and the content-loader 380. In some embodiments, the process may be automated. For example, a source device 399 may establish a wireless connection with the vehicle 30 (e.g., via the content-loader 380) upon detecting the vehicle 30, the content-loader 380, or a device associated with the vehicle 30. Similarly, the vehicle 30 (or a device on the vehicle 30) may establish a wireless connection upon detecting the content-loader 399. In any event, once the content has been uploaded to the vehicle 30, the vehicle 30 may provide the content to passengers (e.g., while in transit).

4. An Example CDS 40

FIG. 4 illustrates an example CDS 40 according to an embodiment. Generally speaking, the CDS 40 is platform or system configured to distribute multimedia content to other systems or devices. Typically the CDS 40 distributes the multimedia content to consumer devices 60 (an example of which is shown in FIG. 6). Generally speaking, the distributed multimedia content is consumed by an end-user of the consumer device 60. For example, the CDS 40 may stream audio and/or video content to a consumer device 60, enabling a user of the consumer device 60 to watch the video and/or listen to the audio.

The CDS 40 may operate in "connected mode" or in "autonomous mode." The CDS 40 is in "connected mode" when the CDS 40 is connected to an external network and able to communicate with the data center 171 shown in FIG. 1. The CDS 40 is in "autonomous mode" when disconnected from other CDSs 40 and/or from the data center 171.

In an embodiment, the CDS 40 is a single electronic device. In some embodiments, the CDS 40 is a distributed computing system, and may include one or more computers, hosts, and/or networking devices. In some embodiments, the CDS 40 may include one or more servers, each of which may be run on a dedicated machine (which may also be referred to as a server in certain circumstances) or on a non-dedicated machine (e.g., a single computer may host multiple servers in certain circumstances). Regardless of its exact architecture, the CDS 40 is generally vehicle-based. That is, the CDS 40 is generally installable or installed in or on a vehicle 30 (shown in FIG. 3) and configured to deliver multimedia content to one or more consumer devices on board the vehicle 30 (or within a particular range of the CDS 40).

In an embodiment, the CDS 40 is not vehicle-based. In such an embodiment, the general location and/or platform at which the CDS 40 is disposed may be referred to as a "station." As an example, the CDS 40 may be disposed at a housing, a room, a building, and/or some other structure or apparatus. In some instances, a CDS 40 may be installed to provide content-delivery capabilities at the station so that consumer devices within range of the station may receive content.

In an embodiment, the CDS 40 may be a component of an Auxiliary Computer Power Unit (ACPU) or may be in communication with an ACPU. The CDS 40 generally includes a processor 411 that is communicatively coupled to a communication interface 413 and a memory system ("memory") 415.

4.01 Processor 411

In an embodiment, the processor 411 is configured to fetch and execute instructions stored at the memory 415. The instructions may be stored as programs, applications, or modules. For example, the processor 411 may execute the modules 423 stored at the memory 415. In an embodiment, the CDS 40 includes multiple processors 411.

4.02 Communication Interface 413

The communication interface 413 is a component or group of components that enable the CDS 40 to communicate with other systems or devices. The communication interface 413 may include a wireless communication interface, a physical communication interface, or both. For example, the communication interface 413 may include a serial interface such as a Universal Serial Bus (USB) interface. In some embodiments the communication interface 413 may include a wireless interface (including or coupled to, e.g., one or more antennas for radio-frequency transmission and reception) for establishing a wireless connection with another device. For example, in some embodiments the communication interface 413 may include a short range wireless interface compliant with standards such as Bluetooth (operating in the 2400-2480 MHz frequency band) or Near Field Communication (operating in the 13.56 MHz frequency band).

4.03 Memory 415

In certain embodiments, the memory 415 may include volatile and/or non-volatile memory and may be removable or non-removable memory. For example, the memory 415 may include computer storage media in the form of random access memory (RAM), read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information. The memory 415 may store data 421 and modules (e.g., programs or applications) 423.

In certain embodiments, the memory 415 includes multiple memory drives and/or multiple memory arrays. For example, the memory 415 may include two or more solid state drives. In an embodiment, the memory 415 includes a partition (e.g., a log 4 partition) containing soft-links to media folders stored at the memory 415. The CDS 40 may be configured to recreate the partition on a new drive upon failure of the drive on which the partition resides.

4.03(a) Data 421 on the Memory 415

The data 421 may include data representing one or more of: a key-store or key collection 431, a journal 432, a library 433, and/or license-data 434. The data 421 may include data that the modules 423 operate on, data used as input for one or more of the module 423, and/or data output by one or more of the modules 423.

4.03(a)(i) Key-Store 431

The key-store 431 may include keys to be used when delivering content (e.g., encryption/decryption keys). Each key in the key-store 431 may enable access to particular content, and may be associated with certain access rights specified by the license-data 434. The keys may be keys capable of decrypting protected content, and the CDS 40 may track associations between keys and content stored at the library 433.

The keys may be keys created using symmetric-key techniques. In such a scenario, a given key in the key-store 431 is both an encryption key and decryption key. In other words, the same key used to encrypt the content (e.g., at the data center 171 shown in FIG. 1) is the key needed to decrypt the content. In some instances, the keys may be keys created using asymmetric-key techniques (sometimes called public-key techniques) involving encryption/decryption key pairs that are mathematically linked. In such instances, an encryption key (e.g., public key) is typically generated so that anything encrypted with the encryption key may only be decrypted with the decryption key (e.g., private key). Thus, the key-store 431 may include decryption keys (e.g., private keys) that are capable of decrypting content that has been encrypted using distinct encryption keys (e.g., public keys). In any event, the keys in the key-store 431 are cryptography keys capable of decrypting content in the library 433.

Each key in the key store 431 is a piece of information or data representing a particular value. Generally, each key may include a specified number of alpha-numeric characters, and any character set may be used. In some instances, key length is defined by a bit value. For example, a 32-bit key may include up to 32 binary characters, or up to eight hexadecimal characters. In some embodiments, key characters are limited to those selected from a particular set. For example, keys may be limited to characters selected from the ASCII character set (which includes 128 characters), hexadecimal characters (which includes 0-9 and A-F), or decimal characters (0-9). In an embodiment, keys may be limited to binary characters, and may be limited to a particular key size (e.g., 128-bit or 256 bit). In certain circumstances, a conversion process may be used to compare keys. For example, in an embodiment a hexadecimal or ASCII key may be converted to binary for purposes of key comparison. In an embodiment, the key-store 431 includes keys of various lengths. While longer keys are generally more secure in nature, the keys in the key-store 431 may generally be any suitable length.

As noted, keys in the key-store 431 may enable access to particular content. In particular, a key may enable access to content for a certain interval. The interval may be based on one or more factors, such as: time, vehicle status, data transfer, user and/or device status, delivery session, content status, or some combination thereof.

For example, a key that enables access based on time-based intervals may enable access for 30 minutes, 2 hours, 24 hours, etc. A key that enables access based on the status or movement of the vehicle 30 may enable access for a trip or a leg of a trip (e.g., during a particular flight). In some circumstances, keys may enable access during intervals associated with delivery sessions. For example, a new key may be assigned for every distinct content delivery session with a consumer device 60, and a new key may be necessary for subsequent sessions. In an embodiment, a single key enables access for multiple sessions.

Further, access intervals may be based on data transfer, where, e.g., a key enables access until a user or consumer device 60 has received content-data exceeding a certain threshold (e.g., 2 GB of data). Regarding user and/or device status, access intervals may be based, e.g., on "good standing" of a user or device. For example, a "good standing" status may be revoked for a user or device if the CDS 40 receives notification that the user has tempered with access control mechanisms, or notification that the user provided fraudulent payment information.

As for access intervals determined based on content, in some embodiments, an access interval may be tied to a particular content title. For example, access to a given movie may be enabled for a certain number of playbacks (e.g., a user may be authorized to watch the movie only a single time). As another example, access intervals may be determined based on classifications for content (e.g., access to older movies may be enabled for a longer time or for more playbacks than would be enabled for new releases).

In some instances, a key may enable access for a short interval (e.g., for a short period of time). In such an embodiment, the CDS 40 may utilize multiple keys when delivering content, even, e.g., for a single content delivery session involving a single content title and a single consumer device 60. In other words, the CDS 40 may utilize a new key on a semi-continuous basis (e.g., every 5 minutes) when delivering content. Semi-continuous key assignment may be beneficial where it is desirable to consistently authenticate and/or verify authorization for a user or device. In particular, semi-continuous key assignment may be used to reduce risks associated with an intercepted key, given that a particular intercepted key will enable content access for only a limited time.

4.03(a)(ii) Journal 432

The journal 432 includes status information relating to content that has been loaded, or is in the process of being loaded, to the memory 415 (e.g., via the content-loader 380 illustrated in FIG. 3).

For example, the journal 432 may include "transfer status" data identifying the status of various content titles or files that have been, will be, and/or are in the process of being loaded to the vehicle 30. The journal 432 may be referred to as a synchronization-state file identifying content that has been loaded to the vehicle 30 via a USB connection, and may include transfer status data relating to the loaded content. In an embodiment, the journal is maintained as long as a media service (e.g., a video service for streaming video) is active at the CDS 40. Such a media service may be managed by the distributor 443. The journal 432 may be xml formatted data. In an embodiment, the journal 432 may be a matrix table with a transfer status field for each file.

The journal 432 may include data regarding one or more content titles (i.e., relating to one or more movies, television shows, or other media titles). For each title, the journal 432 may include (i) an identifier or variable value unique to the title, (ii) an identifier or variable value for identifying a media type and/or file type. The journal 432 may also include transfer status information (e.g., within an ACPU root area). The journal 432 may include data representing the title (e.g., a string or reference to a string for the title), as well as data representing one or more status indicators relevant to the title. These status indicators may indicate whether the following information is available: a title, a trailer for the title, a description for the title, a rating for the title, etc. In some embodiments, the memory 415 may store a summary file including a subset of information from the journal 432 pertaining to various content titles (e.g., identifying a content ID, a content type, and/or transfer status information). In an embodiment, the journal file may include calculated checksums and spare fields.

In an embodiment, the journal 432 includes synchronization-state information about loaded content, indicating whether or not the library 433 has been synchronized (or a degree to which it has been synchronized) with a collection of content on another device.

Example journal data is illustrated in Table 1. The example journal data includes variables to indicate whether various items are locally available (e.g., available at a memory on the vehicle 30) to the CDS 40. In particular, the example journal data indicates the availability of Boxart for the content title, availability of the content itself, availability of a trailer for the content title, availability of a description for the content title, and availability of a DRM key for the content title. In the illustrated embodiment, a value of "1" indicates that the item is available on the vehicle 30. While Table 1 illustrates journal data relating to movies, in some embodiments the journal data includes data relating to other multimedia content.

4.03(a)(iii) Library 433

The library 433 includes content-data. The content-data typically represents one or more content-items (e.g., songs, movies, shows, games, etc.). The content-data in the library 433 may be content-data received at the CDS 40 via the communication interface 413. Further, the content-data in the library 433 may have been loaded to the CDS 40 via a source device 399 and content-loader 380 (shown in FIG. 3).

In an embodiment, the content-data stored at the library 433 is encrypted. Generally the content-data is received at the CDS 40 in an encrypted format. The CDS 40 stores the encrypted content-data at the library 433. During a content-delivery session, the CDS 40 may retrieve encrypted content from the library 433 and may deliver the content to a content consumer device 60. The content consumer device 60 may receive and decrypt the encrypted content using a key transmitted from the CDS. The key used by the content consumer device 60 to decrypt the content may be a key from the key-store 431 that is associated with the delivered content, transmitted by the CDS 40 (e.g., via the licensor 442) to the content consumer device 60. In an embodiment, the CDS 40 does not transmit a key to the content consumer device 60. In such an embodiment, the content consumer device 60 may rely on a shared secret to generate or identify a key capable of decrypting the content.

In some embodiments, the content-data in the library 433 is unencrypted. The content-data may have been received as encrypted data and decrypted by the CDS 40. In some instances, content-data may be received at the CDS 40 as unencrypted data.

In an embodiment, the CDS 40 encrypts content prior to delivery. For example, the CDS 40 may implement a multiple-encryption scheme, adding an encryption layer to already encrypted content-data. Accordingly, the CDS 40 may transmit encrypted data with multiple encryption layers. In some instances, the CDS 40 may perform "on-the-fly" encryption by encrypting content during, or prior to, the delivery process.

4.03(a)(iv) License-Data 434

The license-data 434 includes data relating to issued licenses. In short, a license is an authorization or permission to access certain content. The license data 434 may contain a license record for each license, where each license record is a collection of information pertaining to the access rights granted for particular content in the library 433. For example, a license record (sometimes referred to as a "license" for short) may include or reference a key from the key store 431 for decrypting particular content, as well as data representing a number of rules or conditions for accessing the particular content.

Each license record may be a collection of data that includes or references (i) a key (e.g., for encryption or decryption) from the key-store 431, (ii) particular content associated with the key, (iii) identities associated with the key (e.g., particular ID(s) for consumer devices 60 or users of content consumers 60), and/or (iv) access rights or rules associated with the key, the particular content, and/or the identities. In some instances the CDS 40 may use the license-data 434 to perform an authorization verification to verify that a particular content consumer device 60 is authorized to access particular content from the library 433.

In an example authorization verification operation, the CDS 40 may receive a request for a key or a request for content (i.e., a content-request) from a consumer device 60. The CDS 40 may check the license data 434 to determine whether content-delivery is permitted or authorized. In other words, the CDS 40 may determine whether the license data 434 indicates that the consumer device 60 (or user of the consumer device 60) is permitted to receive content, and/or whether the consumer device 60 (or the user) is permitted to receive particular content (e.g., particular requested content).

To further illustrate, a content-request may include identification information. In an embodiment, the CDS 40 may request identification information from the consumer device 60. Alternatively, the consumer device 60 may provide identification information without a request from the CDS 40. Regardless, the CDS 40 may compare the provided identification information to the license-data 434 to determine whether the requested access is authorized. For example, the identification information may be a particular username and password. The CDS 40 may reject the request if the username/password combination does not match a username/password combination in the license-data 434. As another example, the provided username/password combination may match a combination in the license-data 434, but the CDS 40 may reject the request if the requested use is not authorized (e.g., the user/password combination is authorized to view a first movie, but not a second movie). In an embodiment, the identification information is an identity, such as a user ID or a device ID.

In an embodiment, the content consumer device 60 transmits identification to the CDS 40 without direct input from a user. In other words, the authorization process may occur in the background from the user's perspective, where, e.g., the content consumer device 60 sends an identifier stored in memory, or generated in real-time, associated with the content consumer device 60 (e.g., based on a request received from the CDS 40).

To further illustrate, the content-request may include a token tied to particular content. The particular content may be content requested or selected by the consumer device 60 (i.e., selected-content). In other words, a user may interact with the consumer device 60 to select a particular movie or television title, for example. Accordingly, a token may be transmitted to the CDS 40 that is tied to the particular movie or television title, enabling the CDS 40 to identify the content item selected by the user of the consumer device 60.

As noted, the license-data 434 may identify access rights for content (e.g., for content the library 433). For example, a license record may identify certain time periods during which content can be accessed (e.g., unlimited or limited access may be granted for 24 hours, a week, etc.); a certain duration for which content can be accessed (e.g., access may be granted for 2 hours of total playback); certain authorization codes which may be used to access content (e.g., access may be granted when a user provides an authorized code); certain authorized content; and certain authorized uses of content. In an embodiment, a key associated with a particular license record may only enable content-access so long as the access is consistent with the access rights specified by the license record.

An authorization code may be a unique identity or identifier, such as a serial number. In an embodiment, an authorization code may be issued to an authorized device or user. The user or device may provide identification information to the CDS 40 by providing an issued authorization code. The CDS 40 may then grant access for particular content upon authenticating the authorization code (i.e., upon determining that the provided code matches an authorized code identified in the license-data 434). Authorization codes may be tied to certain authorized devices permitted to access the content (e.g., access may be granted to devices having a particular MAC address or a particular "fingerprint" generated based on device hardware). In an embodiment, the authorization codes may be tied to particular authorized users. For example, access may be granted based on a code entered by a user, such as a username, a password, a username/password combination, or a pin.

In some instances, the license-data 434 may include biometric information, or identification information generated based on biometric information, identifying authorized users. For example, the license-data 434 may include biometric information relating to fingerprint or eye scans.

Regarding authorized content specified by the license-data 434, in some instances particular content titles may be authorized for use while others are not. Similarly, in some instances only particular types of content may be authorized for use (e.g., access to TV shows may be authorized, but access to movies may not be authorized).

Regarding authorized uses of content, the license-data 434 may identify authorized methods for providing content, and/or may identify authorized actions permitted to be taken with content once it has been provided. For example, streaming may be authorized, but saving content to a hard-drive for later use may not be authorized. As another example, the license-data 434 may indicate whether copying content is authorized, and/or how many copies are authorized. Similarly, the license-data 434 may indicate whether playback of content is authorized, as well as a number of times the content is authorized to be played or accessed.

4.03(a)(v) Usage Log 435

The usage log 435 may include historical data regarding content consumption by one or more consumer devices 60. For example, the usage log 435 may include a record of particular content consumed by various devices 60. The usage log 435 may be utilized to track content usage according to time, the amount of information consumed (e.g., according to megabytes, gigabytes, etc.), sessions, etc.

4.03(b) Modules 423 on the Memory 415

The modules 423 are applications or services that may be executed by a processor 411 of the CDS 40. The modules 423 may include a content-loading manager ("CL manager") 441, a licensor 442, a distributor 443, a portal 444, and/or a reporter 445.

In an embodiment, the CDS 40 may include one or more servers providing the functionality associated with the module(s) 423. In an embodiment, the CDS 40 may include a single machine that hosts such servers. In some embodiments, the CDS 40 comprises a number of machines (e.g., in a distributed computing environment) hosting such servers. As an example, each of the modules 423 may be hosted on a dedicated machine.

4.03(b)(i) CL Manager 441

The CL manager 441 manages content-loading procedures for transferring content-data to the memory 415. The content-data may be received at the CDS 40 via the communication interface 413, and/or via the content-loader 380 shown in FIG. 3. In some instances, the content-data is received from another device capable of establishing connection to the communication interface 413. Regardless of how it is received, loaded content-data may be stored to the library 433 at the memory 415. In addition to transferring content to the memory 415, the CL manager 441 may perform an error detection procedure on content-data (e.g., a checksum procedure).

The CDS 40 may receive content included in a content-distribution. A content-distribution is a collection of content and files associated with the content. A content-distribution may include: a set of content (i.e., content-data for a set of titles), a manifest file identifying the particular content in the set of content, various accessory files, and/or a second manifest file identifying the particular accessory files. The accessory files may include catalog files, user interface files, DRM database files, and/or public keys for encrypting credit card data. After receiving a content-distribution, the content-loader 380 may forward the content-distribution to the CDS 40.

The CL manager 441 causes the processor 411 to transfer received content-data to the memory 415. The content-data may be received via wireless or wired connection to the communication interface 413. In an embodiment, the content-data is automatically transferred to the memory 415 (e.g., when the processor 411 detects content-data available for transfer via the communication interface 413) with minimal or no involvement from a user of the CDS 40 or of the transferring device or system. In some embodiments, the CDS 40 may detect (e.g., via a signal from the content-loader 380) a connection between the content-loader 380 and a device capable of transferring content (e.g., a potential source device 399 such as that shown in FIG. 3). For example, the CDS 40 may detect that the content-loader 380 has established a wired connection to a source device 399 (e.g., detecting connection via a port, such as a USB port, at the content-loader 380) or a wireless connection to the device (e.g., detecting radio communication). Such detection may cause the CL manager 441 to trigger a content transfer, resulting in content-data being transmitted from the source device 399 to the content-loader 380, where it may be forwarded to CDS 40 to be stored at the memory 415.

In some instances, a user may initiate or facilitate data transfer to the memory 415. For example, a user may interact with the CDS 40 at a user-interface (not shown) of the CDS 40 or at a user interface of the source device 399. The user's interaction may result in a command being received (e.g., via a user interface or via the communication interface 413) at the processor 411. In response to the command, the CL manager 441 may cause the processor 411 to transfer content-data received at the communication interface 413 to the memory 415 (where the content-data may be stored as part of the library 433). In some instances, the CDS 40 may transmit a signal (e.g., a status signal) via the communication interface 413 to notify the transferring system when the content-data has completed transfer.

In an embodiment, the CL manager 441 causes the processor 411 to decompress compressed files in the content-distribution (if necessary), and to log results of the content-loading process. In particular, the processor 411 may log results of the content-loading process by generating or updating the journal 432. For a content-loading process relating to a particular content-distribution, the CL manager 441 may cause the processor 411 to create or update a "transfer status" variable in the journal 432 for each file in the content-distribution. The "transfer status" variable generally indicates whether a particular file from the content-distribution is present on the vehicle 30 (e.g., stored at the memory 415 of the CDS 40). If the journal 432 indicates that a file is not present on the vehicle 30, an error may have occurred in the content-loading process. In short, the journal 432 includes "transfer status" information for one or more content-distributions that have been loaded to a CDS 40. As a result, the journal 432 may later be referenced to determine whether a particular file from a content-distribution was successfully transferred to the memory 415 of the CDS 40 during a content-loading procedure.

4.03(b)(ii) Licensor 442

The licensor 442 may grant and/or verify access rights for particular identities requesting access to content (e.g., requesting content delivery). An identity may correspond to a device (e.g., a device ID corresponding to a consumer device 60) or a user (e.g., a user ID corresponding to a particular person). In an embodiment, the licensor 442 is a server hosted by a dedicated machine. In some embodiments, the licensor 442 is a module executed at a machine that hosts other of the modules 423.

The licensor 442 may grant access rights based on a financial transaction with a consumer. In some instances, the licensor 442 acts as a payment processor that handles financial transactions with consumer devices 60. In particular, the licensor 442 may include the payment processor 206 shown in FIG. 2, enabling the licensor 442 to handle financial transactions.

In an embodiment, the licensor 442 is a proxy licensor that coordinates with a license server external to the CDS 40. For example, the licensor 442 may manage a set of keys, from a collection of keys managed by the external license server, in place of the external license server. Further, when acting as a proxy license server, the licensor 442 may periodically synchronize with the external license server. By acting as a proxy licensor, the licensor 442 enables the CDS 40 to maintain licensing functionality regardless of the status of its connection to an external licensing server.

In some embodiments, financial transactions are handled by a payment processor separate from the licensor 442. For example, the licensor 442 may call a payment processor system (which may be internally or externally located relative to the vehicle 30) to handle financial transactions. The payment processor may then notify the licensor 442 of successful or unsuccessful payment. The licensor 442 generally grants access rights if a payment is successful, and denies access rights if a payment is unsuccessful.

When granting access rights, the licensor 442 creates or updates the license-data 434 to reflect the granted access rights. For example, the license-data 434 may be updated to indicate that a particular content consumer device 60 (e.g., identified by a specific device ID) is authorized to stream a particular content title (e.g., identified by a specific content title ID).

In an embodiment, the licensor 442 may transmit a license or key to the appropriate content consumer device 60 after access rights have been granted. The license or key (e.g., a decryption key) may enable the content consumer device 60 to access content (e.g., to decrypt an encrypted movie file and provide the movie via a display and/or speakers). The content consumer device 60 may store a received license or key in some instances. For example, the license or key may be stored to maintain proof of authorization or proof of payment.

In an embodiment, the CDS 40 may perform an authorization verification before initiating a delivery session in order to verify that a content consumer device 60 is authorized to receive the content. In such an embodiment, the licensor 442 may handle authorization requests and notify the distributor 443 of whether a particular content-request is authorized. The authorization verification may include the CDS 40 checking the license-data 434 at the memory 415 and/or requesting a license from the content consumer device 60 to determine if the requested use is authorized. If the consumer device 60 does not have a license or key, the CDS 40 may initiate a payment processing operation so that the end-user of the consumer device 60 can pay for content. The CDS 40 may transmit a license and/or key to the consumer device 60 payment information is received, processed, and/or verified.

4.03(b)(iii) Content Distributor 443

The distributor 443 may be utilized by the CDS 40 to (i) receive content-selections from a content consumer device 60, and (ii) transmit content-data for the selected content to the content consumer device 60. In an embodiment, the distributor 443 is a server hosted by a dedicated machine. In some embodiments, the distributor 443 is a module executed at a machine that hosts other of the modules 423.

In example operation, the distributor 443 may be executed by the processor 411 to transmit via the communication interface 413 data representing available content. In example operation, content-selection data may subsequently be received at the communication interface 413. Generally speaking, received content-selection data originates from a content consumer device 60. In any event, the distributor 443 may cause the processor 411 to (i) identify particular content from the library 433 based on the received content-selection data, (ii) retrieve content-data representing the particular content from the library 433, and (iii) transmit the content-data via the communication interface 413 to the appropriate content consumer device 60.

Generally speaking, the CDS 40 grants or verifies authorization for the selected content (e.g., by initiating a payment process or verifying previous payment) before retrieving and sending the content-data to the appropriate content consumer device 60. The licensor 442 may handle the authorization process before the distributor 443 proceeds with initiating a content-delivery session to transmit content-data.

In an embodiment, the distributor 443 may include, or may invoke, a content service and/or a consumer portal 444 to enable the CDS 40 to provide the above described functionality. In example operation of such an embodiment, a content-selection is received via the portal 444 and the content service transmits content-data representing the selected content. The distributor 443 may manage sessions between the CDS 40 and content consumers 60.

4.03(b)(iv) Consumer Portal 444

The consumer portal ("portal") 444 is a module or service that facilitates interactions between consumer devices 60 and the CDS 40. In particular, the portal 444 operates to provide an interface (e.g., a graphical interface) to the content consumer device 60, enabling a user of the content consumer device 60 to select or request content for consumption. The portal 444 may receive a content-selection from the consumer device 60. The distributor 443 may transmit content-data to the consumer device 260 based on the received content-selection.

The portal 444 may include one or more services or applications executed at the CDS 40. The portal 444 may access and provide various resources (e.g., documents, files, and/or services) to other devices, such as the consumer devices 60 (e.g., via the in-vehicle network 312 shown in FIG. 3). In particular, the portal 444 may transmit content-option data to the content consumer device 60. The content-option data generally represents content options available to a content consumer device 60 for potential selection. For example, the content options may include content stored in the library 433, or a subset of the stored content. The content options may be identified by text, image, or any other suitable method.

In certain embodiments, the portal 444 may be (or may include) a web page and/or service that can be hosted by the CDS 40 and made available to a consumer device 60. The content-option data may be transmitted using such a web page and/or service to facilitate content-selection at a content consumer device 60. In addition to the content-option data, the portal 444 may transmit other data to facilitate content-selection by a content consumer device 60. For example, the portal 444 may transmit graphic data, which may be utilized by the content consumer device 60 to provide a content-selection interface for a user. More particularly, the graphic data may specify a particular layout and/or particular image(s) to be provided as part of the content-selection interface (e.g., a layout of a web page).

In some embodiments, the portal 444 may interact with a client application at the content consumer device 60. In some of these embodiments, the content consumer device 60 may largely rely on the client application and locally stored data at the content consumer device 60 to provide the content-selection interface, requiring little from the portal 444 other than content options.

4.03(b)(v) Reporter 445

The reporter 445 reports content delivery performed at CDS 40. In particular, the reporter 445 causes the processor 411 to transmit a report via the communication interface 413. In an embodiment, the report is received at the data center data center 171 shown in FIG. 1B.

Figure 5A:
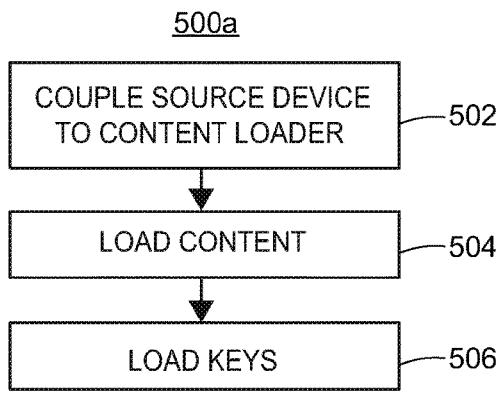
FIG. 5A illustrates an example method for loading content to a vehicle according to an embodiment.

5. Example Methods for Content Loading, Licensing, Delivering, and Tracking 5.01 Content Loading FIG. 5A illustrates example method 500a for loading content to a vehicle 30 (shown in FIG. 3) according to an embodiment. The method 500a may be implemented by a content-loader and/or CDS. The method 500a may be saved as a set of instructions, routines, programs, or modules at computer readable media found, for example, in memory devices accessible by the content-loader 380 and/or the vehicle 30.

The method 500a begins when a source device 399 is communicatively coupled to an electronics system 301 of the vehicle 30 (e.g., connected to the content-loader 380 and/or the CDS 340) (block 502). The source device 399 may be any suitable electronic device with a memory for storing content-data. The source device 399 may include a group of content files corresponding to the content itself (e.g., video or audio data). The group of files stored on the source device 399 may be referred to as a "content-distribution." Generally speaking, the content-distribution originates from a server or some other computer system used to host multimedia content. In some instances, the content-distribution is copied or transmitted from the data center 171.

The source device 399 may be physically coupled to the content-loader 380 (e.g., via a port at the content-loader 380, such as a USB port). In some embodiments, the source device 399 may be wirelessly coupled to the content-loader 380 via one or more radio-frequency ("RF") channels. The RF channels may be part of a near-field communication link or wireless network such as a personal area network ("PAN"), a local area network ("LAN"), and/or a wide area network ("WAN"), depending on the embodiment. In some instances the content-loader 380 and/or CDS 40 automatically detects new source device 399 connections to the content-loader 380. Once connected, the CDS 40 may mount the source device 399 and make the file systems, files, and directories accessible by the content-loader 380.

Upon connection, the content-distribution may be loaded to the vehicle 30 via the content-loader 380 (blocks 504 and 506). The content-loader 380 may store received content files to a memory on the vehicle 30 (e.g., the memory 415 shown in FIG. 4). In an embodiment, the content-distribution data is stored at a memory accessible by an ACPU. The content-distribution may be loaded as a file or group of files, and may include compressed and/or uncompressed files.

The content-distribution data loaded to the vehicle 30 may be encrypted. In an embodiment, content-distribution data may have been encrypted by a packager or license server (e.g., located at the data center 171). Generally, encryption keys associated with the encrypted content are loaded to the vehicle 30 along with the encrypted content. The keys may be stored to the key-store 431 shown in FIG. 4.

In an embodiment, the content-distribution may include accessory files relating to the content files. For example, accessory files may include catalog files, user interface files, DRM database files, and/or public key(s) for encrypting credit card data. In an embodiment, an xml-formatted manifest file references the accessory files relating to the content files. This manifest file may be loaded to the vehicle 30, and the vehicle 30 may utilize the manifest file to copy the accessory files listed in the manifest file to a memory at the vehicle 30 (e.g., memory 415). Table 2 shows an example manifest file that references accessory files. The accessory files may be loaded to the vehicle 30 before the content files are loaded.

In some embodiments, the CDS 40 may perform an error detection procedure on the accessory files. The error detection procedure may be performed as the accessory files are loaded to the vehicle 30. As an example, the CDS 40 may perform a checksum verification procedure. A checksum is a function or calculation that generates an output using a particular file or group of data as input (an accessory file in this case). The output of the checksum function is referred to as a checksum or hash value. While the checksum function should always produce the same hash value for a particular file, any change to the input file (i.e., the accessory file) will result in the checksum function generating a different hash value. Accordingly, checksum calculations may be used to determine whether errors have been introduced during transmission (e.g., from the content-loader 380 to the vehicle 30) or storage of the content. In an embodiment, the calculated checksum may be an md5sum calculated by the content-loader 380. In some instances, the md5sum is calculated by a USB stick manufacturer. In some embodiments, checksum functions other than md5sum may additionally or alternatively be utilized.

If the checksum verification fails for a particular accessory file that was copied to a memory on the vehicle 30, the accessory file may be removed from the memory (block 515). If the checksum verification passes, the accessory file may be decompressed if necessary. If the transferred content file was not compressed, decompression may not be performed.

Once the accessory files have been copied, verified, and decompressed (where necessary), the content files may be loaded to the vehicle 30 in an embodiment. In some instances, the content files are loaded as part of a synchronization process. For synchronization, a check may be performed to verify that content files in the content-distribution are not already loaded to the vehicle 30. Performing a synchronization process may include generating or modifying journal data, which may be stored as the journal 464 shown in FIG. 4. For example, a journal file may be constructed based on files copied for a particular batch (e.g., a particular loading session during which a group of content files were loaded to the vehicle 30).

In an embodiment, the keys are uploaded to the vehicle 30 by utilizing a Sync Service.

5.02 Content Access Management and Licensing

Figure 5B:
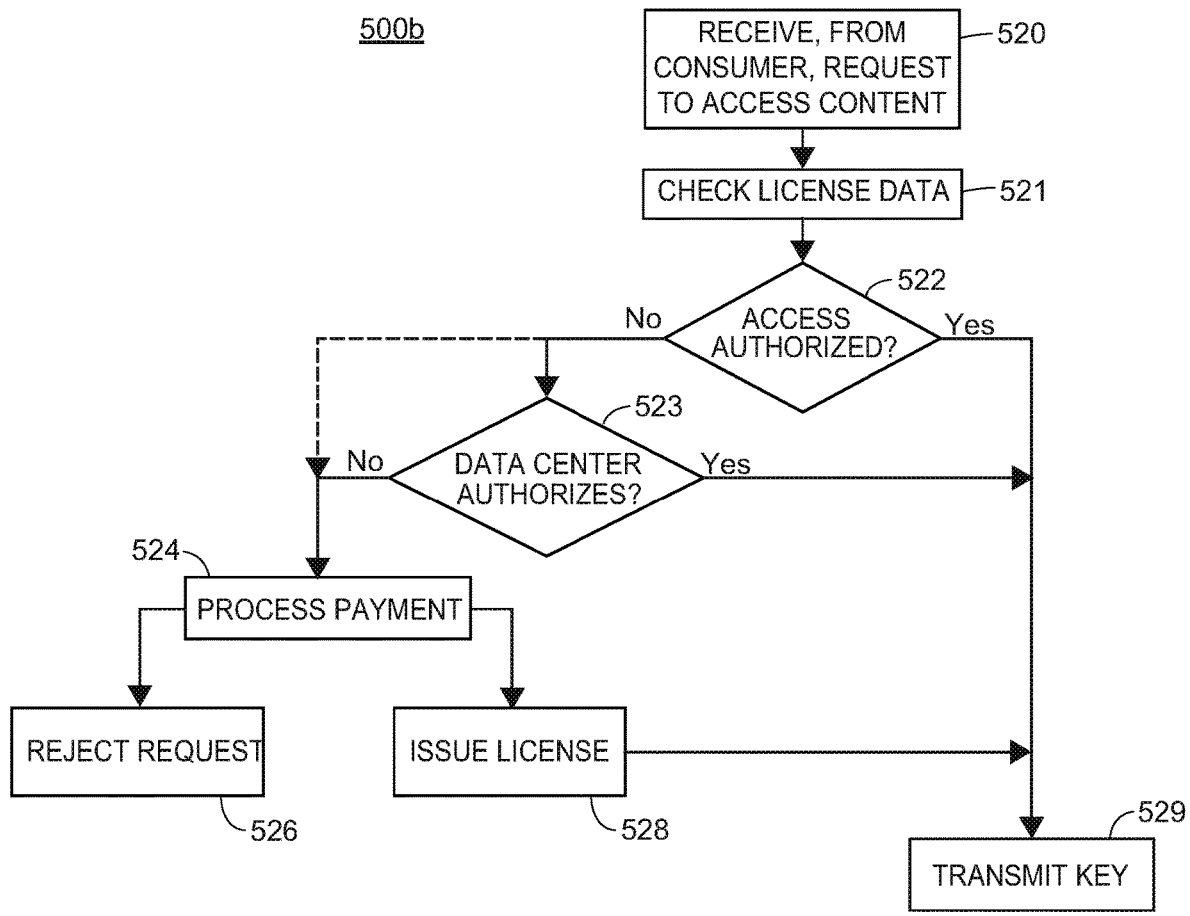
FIG. 5B illustrates an example method for managing access to content and licensing content according to an embodiment.

FIG. 5B illustrates an example method 500b for managing access to content and licensing content. The method 500b may be implemented by the CDS 40 shown in FIG. 4. The method 500b may be saved as a set of instructions, routines, programs, or modules at computer readable media found, for example, at the memory 415 of the CDS 40. In some instances, the method 500b is implemented by a server, such as a DRM server or a licensing server. While the method 500b is described with reference to the CDS 40, the method 500b may be implemented according to other embodiments not depicted in FIG. 4.

The method 500b begins when the CDS 40 receives a content-request or a license-request (block 520). Generally, the request originates at a consumer device 60. The request may be received at the communication interface 413 (e.g., wirelessly) of the CDS 40 via the in-vehicle network 312 (shown in FIG. 3).

The CDS 40 may check license data 434 stored at the memory 415 to determine whether the requested access is authorized (blocks 521 and 522). For example, the CDS 40 may determine whether a license record exists pertaining to a received identity (e.g., a consumer ID or a user ID) or token (e.g., a content identifier). The identity and/or token may be received at the CDS 40 before, concurrently with, or after the content-request. For example, the identity and/or token may be included in the received data representing the content-request. In some instances, the identity and/or token are received at the CDS 40 after the content-request is received. For example, the CDS 40 may request either or both the identity and token after receiving the content-request.

In any event, if an appropriate license record is identified, the record may include data indicating that the requested access is authorized or not authorized. In some instances, the record may include certain rules, restrictions, or conditions for authorization (e.g., relating to time, download limits, number of views, etc.). If a license record does not exist, the CDS 40 may (i) request that a data center (e.g., data center 171 shown in FIG. 1) verify authorization (if communication with the data center is possible), or (ii) begin a payment processing procedure.

Regarding the data center authorization (block 523), the CDS 40 may transmit a request (e.g., via the network 112) that the data center 171 (or more specifically, a server at the data center 171) verify that the requested access is authorized. A signal may be transmitted to and received at the CDS 40 indicating that the access is authorized or not authorized. If not authorized, the CDS 40 may reject the content-request of the consumer device 60. If authorized, the CDS 40 may transmit a key to be received at the consumer device 60 so that the consumer device 60 can decrypt and display content (the content may also be sent by the CDS 40, e.g., via the distributor 443) (block 529). It should be noted that block 523 is not always implemented. For example, when the CDS 40 is operating in autonomous mode, the CDS 40 typically will not communicate with the data center 171. Accordingly, block 523 may be skipped in certain circumstances.

The CDS 40 may implement a payment processing procedure (block 523). In some embodiments, the CDS 40 may implement a payment processing procedure by establishing communication between the consumer device 60 and a payment processor. The payment processor may be located on the vehicle 30 or off the vehicle 30. In an embodiment, the payment processor is an e-commerce payment system accessible via a network connection (e.g., accessible via connection to the world-wide web). In an embodiment, the payment processor is a component of the CDN 10*b*, and may be located at the data center 171. In some instances, the payment processor is managed by a third party, and may not be a component of the data center 171. In any event, the CDS 40 may implement the payment processing procedure by establishing communication between the consumer device 60 and a payment processor (e.g., via the network 112). In such a scenario, the CDS 40 may receive notification of successful payment from the payment processor via the network 112.

In some instances, the CDS 40 implements a payment processor without accessing an external network. For example, the CDS 40 may implement a payment processing procedure by requesting payment information from the consumer device 60. The consumer device 60 may transmit payment information (e.g., credit card information) that is received at the CDS 40. Upon receiving the payment information, the CDS 40 may generate a license (e.g., by updating the license-data 434) and transmitting a key to the consumer device 60 (blocks 528 and 529). Such a license may be temporary in nature.

For example, the license may permit content access until the CDS 40 can establish communication with the data center 171 to verify the validity of the payment information or to finalize a financial transaction with the payment information. The CDS 40 may transmit the payment information to the data center 171. The data center 171 may initiate a financial transaction using the payment information (e.g., by interacting with third party credit card processing systems). The CDS 40 may receive a signal from the data center 171 indicating that the financial transaction was successful or unsuccessful.

If the CDS 40 receives a signal from the data center 171 indicating that a financial transaction using the payment information was unsuccessful, the CDS 40 may stop providing content that it may have been providing in accordance with the temporary license. If the CDS 40 receives a signal from the data center 171 indicating that a financial transaction was successful, the CDS 40 may provide content, or continue providing content, as it was with the temporary license. In some instance the CDS 40 may also update the license-data 434 to indicate that the payment information has been processed and that a financial transaction has been successfully carried out.

If a payment is not successfully processed, the CDS 40 may not issue a license (block 526). In some instances, payment may be unsuccessful because the consumer device 60 fails to provide payment information to the CDS 40 or to a payment processor. In other instances, payment may be unsuccessful because the payment information received from the consumer device 60 is not valid. For example, the consumer device 60 may provide credit card information for an expired or overdrawn credit card. In certain circumstances, a license may be issued despite a payment not being processed. For example, the CDS 40 may issue a license with the expectation that payment information will later be received from the consumer device 60. To illustrate, a CDS 40 may provide content and/or keys during a flight, and may subsequently request payment information (e.g., at the end of the flight). Such operation may be beneficial where a payment history exists for the consumer device 60 (or the user of the consumer device 60) suggesting, e.g., that such a transaction is low-risk. In some instances, the CDS 40 or the data center 171 may have pre-existing payment information. If the pre-existing payment information has been previously processed, e.g., the CDS 40 may provide access to content without requiring payment information and/or without requiring immediate processing of a financial transaction.

As noted, the CDS 40 may issue a license (block 528). Issuing a license typically includes creating a license record (e.g., at the memory 415) relating to access rights. For example, a license record may be added to the license-data 434. Further, issuing a license generally includes assigning a key (e.g., an encryption and/or decryption key) for accessing the content. For example, the CDS 40 may assign a key, from the key-store 461, to a particular user or a particular consumer device 60.

After issuing a license, license-data and/or a key for decrypting the content may be transmitted to the consumer device 60. The transmitted license-data may include unique information corresponding to a particular license record in the license-data 434. For example, the transmitted license-data may include a key, token, or authorization code. In some circumstances, the receiving consumer device 60 may receive the license and later transmit the license to the CDS 40 as part of an authorization verification process. In short, a user or consumer device 60 may rely on the license to prove that a particular use of content is authorized. Further, in some embodiments the transmitted license may be digitally signed (e.g., by the CDS 40). Accordingly, the transmitted license may later be verified as a legitimately issued license.

The CDS 40 may create or update a record (e.g., the license-data 434 or the usage log 435) in light of licenses that have been generated, keys that have been assigned or sent to consumers 60, and/or content-data that has been delivered to consumers 60.

5.03 Content Delivery and Tracking

Figure 5C:
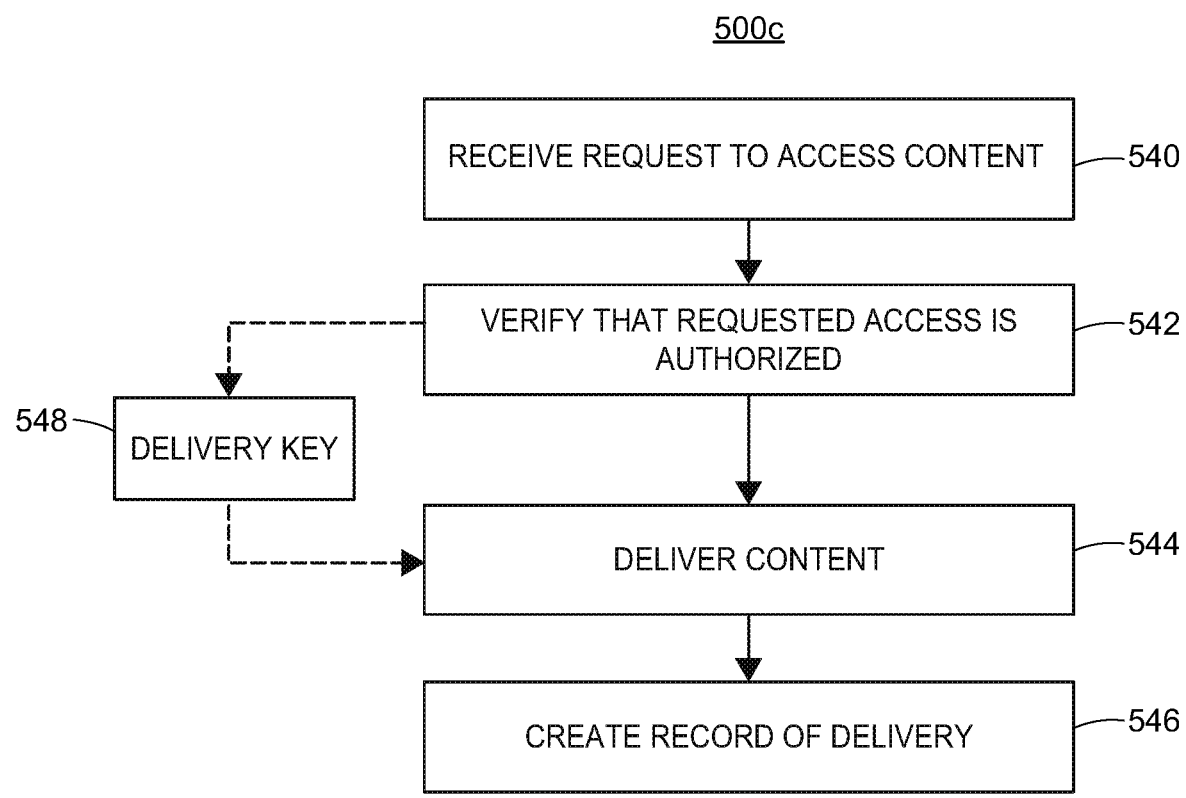
FIG. 5C illustrates an example method for delivering content and tracking delivery according to an embodiment.

FIG. 5C illustrates an example method 500*c* delivering content and tracking delivery. The method 500*c* may be implemented at the CDS 40 (shown in FIG. 4). The method 500*c* may be saved as a set of instructions, routines, programs, or modules at computer readable media found, for example, at memory devices accessible by the CDS 40. While the method 500*c* is described with reference to the CDS 40, the methods 500*a* and 500*b* may be implemented according to other embodiments not depicted in FIG. 4.

The method 500*c* begins when the CDS 40 receives a request to access content (block 540). In general, the request originates at a consumer device 60. The CDS 40 verifies that the requested access is authorized (block 542). For example, the request may represent a request to watch "The Wizard of Oz." Accordingly, the CDS 40 may verify that the requesting user or consumer device 60 is authorized to watch "The Wizard of Oz." Specifically, the CDS 40 may check the license-data 434 to verify authorization.

In example operation, the CDS 40 receives identification information associated with the request. The CDS 40 may perform a lookup with respect to the license-data 434 to identify a license record corresponding to the identification information. If a corresponding license record exists, the CDS 40 may determine whether access to "The Wizard of Oz" is authorized according to the corresponding license record. For example, the CDS 40 may compare a received content identifier ("ID") to one or more content IDs referenced by the license record. A match between a received ID and an ID reference by the license record may result in a verification of authorization. On the other hand, failure to identify a match may result in a failure to verify.

When authorization is verified, the CDS 40 delivers the appropriate content-data. In particular, the CDS 40 may transmit content-data (e.g., audio and/or video data) to the requesting consumer device 60.

The CDS 40 may create a record of the delivery (block 546). In an embodiment, a record of the delivery is created by updating the license-data 434 or the usage log 435 based on the key assigned for the delivery (which may occur prior to delivering the content). For example, in some embodiments, a new key is assigned for every new delivery session. The license-data 434 and/or usage log 435 may include a record of every key that has been assigned. As a result, content delivery sessions may be identified by identifying key assignments included in the license-data 434. In some embodiments, a single key may be utilized for more than one delivery session, or for more than a single content title.

The license-data 434 may include an access log associated with each assigned key. For example, an access log may be associated to key XYZ, and may include an attribute for "accessed titles" that identifies content IDs for content accessed using key XYZ. The access log may also include other attributes, such as time watched (e.g., identifying how many minutes or hours of content have been consumed using key XYZ), time/date of key assignment, most recent user activity date (e.g., identifying how far along a user was in watching a video when the last session terminated), etc.

In some circumstances, the CDS 40 may assign a key and/or transmit a key to the content consumer device 60 (block 548). For example, the CDS 40 may determine that the license data 434 indicates that the requested access is authorized. Accordingly, the CDS 40 may transmit a key to the consumer device 60 so that the consumer device 60 can decrypt and display content. As described in further detail with reference to FIG. 5B, the CDS 40 may, in some instances, implement a licensing process (see, e.g., method 500b) to grant the requesting consumer device 60 access rights (e.g., after a consumer has provided payment information). In some instances, the CDS 40 does not transmit a key to the consumer device 60 after verifying that the requested access is authorized. For example, the consumer device 60 may request to resume accessing content when access has previously been granted. In such a situation, the consumer device 60 may have already received a key for decrypting content. Accordingly, the CDS 40 may not transmit a key to the consumer device 60.

6. An Example Consumer Device 60

FIG. 6 illustrates an example content consumer device 60 ("consumer device 60") according to an embodiment. Examples a consumer device 60 may include a laptop computer, a desktop computer, a tablet, a phone, or another electronic device with a user interface capable of presenting multimedia content. The consumer device 60 may be communicatively coupled to a CDS 40 (shown in FIG. 4) via a network such as the in-vehicle network 312 (shown in FIG. 3). For example, the consumer device 60 may wirelessly send and receive.

In example operation, the consumer device 60 may be utilized to consume multimedia content. In particular, the consumer device 60 may connect to a CDN and receive content via a CDS 40 (shown in FIG. 4). As a result, the consumer device 60 allows a user to enjoy access to a library of content made available via a CDS 40, sometimes even in instances when the CDS 40 and the consumer device 60 have no access to an external network.

The consumer device 60 includes one or more processors 611 communicatively connected (e.g., via a system bus) to: a communication interface 613, a memory 615, and a display 617. The consumer device 60 may connect to a network (e.g., the in-vehicle network 312 shown in FIG. 3) via the communication interface 613. The consumer device 60 may utilize the communication interface 613 to wirelessly send and receive data (e.g., to communicate with the CDS 40 shown in FIG. 4).

In example operation, the consumer device 60 transmits a content-request via the communication interface 613. The consumer device 60 receives content via the communication interface 613. The processor 611 may cause the received content to be (i) stored at the memory 615 and/or (ii) displayed by the consumer device 60 via the display 617. The display 617 may be any display, screen, monitor, or projector suitable for displaying images and/or video output. The consumer device 60 may also include speakers (not shown) for providing audio output.

The memory 615 may include volatile and/or nonvolatile memory. The memory 615 includes data 621 and modules 623. In an embodiment, the data 621 includes content-data 631 and/or log data 632. The modules 623 include a CDN client 641 and a browser 642. The modules 623 may include modules not shown (e.g., operating system modules, additional multimedia modules, etc.)

6.01 Content-Data 631

The content-data 631 comprises content-data received via the communication interface 613. In an embodiment, the content-data 631 may represent streaming multimedia content received at the communication interface 613. The content-data 631 may be stored as a temporary file (e.g., in a buffer or cache) to be retrieved and played, e.g., as the content-data 631 is received at the communication interface 613 (or in proximity to when the content-data 631 is received). In other words, the content-data 631 may be retrieved for playback before all of the content-data for a particular content title has been received by the consumer device 60.

In an embodiment, the content-data 631 is stored as a non-temporary file. For example, in some instances the content-data 631 may be stored for retrieval and playback at a time subsequent to receiving the content-data 631 (e.g., minutes, hours, or even days later).

6.02 Log Data 632

The log data 632 generally represents a historical log of actions taken by the consumer device 60 with respect to the content-data 631. For example, the log 632 may identify titles (e.g., movie titles, or identifiers associated with movie titles) for the content-data 631. The log 632 may include one or more data trackers or time trackers. For example, the log 632 may indicate an amount of data (e.g., in megabytes, gigabytes, etc.) received or accessed via the consumer device 60, and/or a measure of time for content received or accessed (e.g., indicating that 30 minutes of a movie have been received by the consumer device 60 or displayed by the consumer device 60). In some instances, an external device (e.g., the CDS 40 shown in FIG. 4, or a device at the data center 171 shown in FIG. 1) may "audit" the consumer device 60, where the consumer device 60 sends the log 632 (or some portion thereof) to the external device.

6.03 Key 633

The key 633 is a cryptography key (i.e., a piece of data capable of being used as input for a cryptographic system) associated with the content-data 631. Typically the content-data 631 is encrypted and not accessible (e.g., for playback) without a key such as the key 633. Utilizing the key 633, the consumer device 60 may decrypt encrypted content-data 631, enabling a user of the consumer device 60 to access the content represented by the content-data 631.

Generally speaking, the key 633 is received by the consumer device 60 via the communication interface 613 before being stored at the memory 615. The key 633 is typically received after the consumer device 60 is granted authorization to access the content-data 631. For example, the licensor 242 (shown in FIG. 2) or the licensor 442 of the CDS 40 (shown in FIG. 4) may grant the consumer device 60 authorization to access the content-data 631, and may send the key 633 to the consumer device 60. In some instances, the consumer device 60 utilizes multiple keys 633 to decrypt content-data 631.

6.04 CDN Client 641 & Browser 642

Generally speaking, the CDN client 641 is a module configured to receive and display content. In an embodiment, the CDN client 641 may be configured to provide a user-interface for receiving a content-selection from a user of the consumer device 60 (i.e., a content-selection interface), and to transmit the content-selection to a CDS 40 (shown in FIG. 4). The CDN client 641 may subsequently receive and display content corresponding to the content-selection.

More particularly, the CDN client 641 may cause the processor 611 to: (i) store content, received at the communication interface 613, to the memory 615 as content-data 631; and (ii) display, via the display 617, the content represented by the content-data 631. The CDN client 641 may decrypt the content-data 631 using the key 633 before displaying the content via the display 617.

The CDN client 641 may be a dedicated module or a non-dedicated module, depending on the embodiment. For example, the CDN client 641 is a stand-alone client in an embodiment. In some embodiments, the CDN client 641 is a plug-in for another application. In such embodiments, the CDN client 641 enables the application to decrypt and display content that the application might otherwise have no way of decrypting and displaying. For example, the CDN client 641 may be a plug-in for a media player application or for a browser 642.

In an embodiment, the browser 642 is capable of content playback. For example, the browser 642 may support HTML5 based playback and/or Flash based playback. In some instances, the browser 642 may serve as an interface for content-selection. In such instances, the browser 642 may launch a dedicated media player to display content (e.g., after content has been selected).

Additional Considerations

Although this text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

The term "processor" generally refers to a hardware processor or processing unit that fetches, decodes, and executes instructions. An "instruction" generally represents a particular operation to be carried out by a processor. Processors may be designed or configured to be compatible with an "instruction-set" that includes particular instructions. Each instruction may include a command and/or an operand that specifies data (or a memory location where data is stored) to be worked upon.

some instances, a "processor" includes a control unit and/or an arithmetic/logic unit (ALU). A control unit includes circuitry used to direct operation of the processor. For example, the control unit may fetch instructions from memory; decode the instructions; direct appropriate data to be moved from memory to other components (e.g., the ALU); execute the instructions; and/or stored data resulting from the executed instructions. The control unit may utilize the ALU to perform an operation by executing instructions (e.g., arithmetic or logical instructions). The ALU may store data resulting from operation in memory or in a register.

Examples of "processors" include a central processing unit (CPU), a microprocessor, an application-specific instruction-set processor (ASIP), a graphics processing unit (GPU), or some combination thereof. An ASIP is generally a component used in a system-on-a-chip design, wherein the instruction set of the ASIP is tailored to a specific application. In some embodiments, the term "processor" may refer to a component of an application-specific integrated circuit (ASIC) customized for a particular use. An ASIC may additionally or alternatively include memory blocks (e.g., ROM, RAM, EEPROM, flash memory, etc.). ASICs, FPGAs, and other integrated circuits (ICs) may be designed using a hardware description language (HDL).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although this detailed description contemplates various embodiments, it should be understood that the legal scope of the invention is defined by the words of the claims set forth at the end of this patent. This detailed description is to be construed as exemplary only and does not describe every possible embodiment, as describing every possible embodiment would be impractical, if not impossible. One could implement numerous alternate embodiments, using either current technology or technology developed after the filing date of this patent, which may fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims of this patent is referred to in this patent in a manner consistent with a single meaning, that is done for sake of clarity only so as to not confuse the reader, and it is not intended that such claim term be limited, by implication or otherwise, to that single meaning.

TABLE 1

(Referenced in Section 4.03)

```
<?xml version="1.0" encoding="UTF-8"?>
<acpu_journal>
    <journal_meta>
        <acpuBatchVersion>35.0</acpuBatchVersion>
        <journalCreationDate>03_14_2013_13_46_29</journalCreationDate>
    </journal_meta>
    <media bL="1" bM="1" bS="1" bXL="1" id="AGCVFF0015" p="1" t="1" xD="0" dRM="1"/>
    <media bL="1" bM="1" bS="1" bXL="1" id="AGCVFF0170" p="1" t="1" xD="0" dRM="1"/>
    <media bL="1" bM="1" bS="1" bXL="1" id="AGCVFF0237" p="1" t="1" xD="0" dRM="1"/>
    <media bL="1" bM="1" bS="1" bXL="1" id="AGCVFF0187" p="1" t="1" xD="0" dRM="1"/>
    <media bL="1" bM="1" bS="1" bXL="1" id="AGCVFF0236" p="1" t="1" xD="0" dRM="1"/>
    <media bL="1" bM="1" bS="1" bXL="1" id="AGCVFF0234" p="1" t="1" xD="0" dRM="1"/>
    <media bL="1" bM="1" bS="1" bXL="1" id="AGCVFF0204" p="1" t="1" xD="0" dRM="1"/>
    <media bL="1" bM="1" bS="1" bXL="1" id="AGCVFF0017" p="1" t="1" xD="0" dRM="1"/>
    <media bL="0" bM="1" bS="1" bXL="1" id="AGCVFF0016" p="1" t="1" xD="0" dRM="1"/>
</acpu_journal>
```

Variables:
bL    Boxart Large presence value
bM    Boxart Medium presence value
bS    Boxart Small presence value
bXL   Boxart Extra-Large presence value
id    media title
p     Primary movie presence value
t     Trailer presence value
xD    Movie Description presence value
dRM   DRM key presence value (indicates if DRM key is present on DRM server)

TABLE 2

(Referenced in section 5.01)

```
<?xml version="1.0" encoding="ISO-8859-1"?>
<video_accessories>
    <meta>
        <acpuBatchVersion>41.0</acpuBatchVersion>
        <acpuBatchDate>2013-04-18</acpuBatchDate>
    </meta>
    <accessory>
        <acpuFilePath>/mnt/drm/drm_db_1/</acpuFilePath>
        <usbFilePath>I:/drm/drm_db_1</usbFilePath>
        <fileSize>16788</fileSize>
```

TABLE 2-continued (Referenced in section 5.01)

```
        <fileType>DRM</fileType>
        <md5sum>332b9a79b47d7b059839fc11002c9a06</md5sum>
    </accessory>
    <accessory>
        <acpuFilePath>/mnt/application/app_1.tgz</acpuFilePath>
        <usbFilePath>I:/application/app_1.tgz</usbFilePath>
        <fileSize>16788</fileSize>
        <fileType>Application</fileType>
        <md5sum>332b9a79b47d7b059839fc11002c9a06</md5sum>
    </accessory>
    <accessory>
        <acpuFilePath>/mnt/application/app_1.tgz.md5</acpuFilePath>
        <usbFilePath>I:/application/app_1.tgz.md5</usbFilePath>
        <fileSize>16788</fileSize>
        <fileType>Checksum</fileType>
        <md5sum>332b9a79b47d7b059839fc11002c9a06</md5sum>
    </accessory>
    <accessory>
        <acpuFilePath>/mnt/configuration/dal_conf_1.tgz</acpuFilePath>
        <usbFilePath>I:/configuration/dal_conf_1.tgz</usbFilePath>
```

TABLE 2-continued (Referenced in section 5.01)

```
        <fileSize>16788</fileSize>
        <fileType>Configuration</fileType>
        <md5sum>332b9a79b47d7b059839fc11002c9a06</md5sum>
    </accessory>
    <accessory>
        <acpuFilePath>/mnt/configuration/dal_conf_1.tgz. md5</acpuFilePath>
        <usbFilePath>I:/configuration/dal_conf_1.tgz.md5</usbFilePath>
        <fileSize>16788</fileSize>
        <fileType>Checksum</fileType>
```

TABLE 2-continued (Referenced in section 5.01)

```
    <md5sum>332b9a79b47d7b059839fc11002c9a06</md5sum>
  </accessory>
  <accessory>
    <acpuFilePath>/mnt/properties/current.properties</acpuFilePath>
    <usbFilePath>I:/properties/current.properties</usbFilePath>
    <fileSize>16788</fileSize>
    <fileType>Properties</fileType>
    <md5sum>332b9a79b47d7b059839fc11002c9a06</md5sum>
  </accessory>
  <accessory>
    <acpuFilePath>/mnt/properties/current.properties.md5</acpuFilePath>
    <usbFilePath>I:/properties/current.properties.md5</usbFilePath>
    <fileSize>16788</fileSize>
    <fileType>Checksum</fileType>
    <md5sum>332b9a79b47d7b059839fc11002c9a06</md5sum>
  </accessory>
  <accessory>
    <acpuFilePath>/mnt/p_k/ats_key.jks</acpuFilePath>
    <usbFilePath>I:/p_k/ats_keys.jks</usbFilePath>
    <fileSize>16788</fileSize>
    <fileType>PK</fileType>
    <md5sum>332b9a79b47d7b059839fc11002c9a06</md5sum>
  </accessory>
</video_accessories>
```

What is claimed is:

1. A system for providing an in-vehicle content-delivery service to mobile consumer devices, the system comprising:
a content delivery system disposed at a vehicle, the content delivery system including:
one or more processors;
one or more communication interfaces that are coupled to the one or more processors and that are configured to: (i) communicatively couple the content delivery system to one or more mobile consumer devices via an in-vehicle network for the vehicle, and (ii) communicatively couple the content delivery system to a license server that is external to the vehicle and that is configured to authorize or not authorize content-requests originating from the one or more mobile consumer devices; and
one or more memories coupled to the one or more processors and storing instructions that, when executed by the one or more processors, cause the content delivery system to:
(i) detect a loss of a connection between the content delivery system and the license server;
(ii) respond to the detected loss by operating as a proxy for the license server, including, while the content delivery system is disconnected from the license server, performing an authorization operation to determine a particular content-request from a particular mobile consumer device is authorized; and
(iii) transmit content to the particular mobile consumer device in response to, while the content delivery system remains disconnected from the license server, determining that the particular content-request from the particular mobile consumer device is authorized.

2. The system of claim 1, wherein performing the authorization operation includes analyzing a unique user identifier for the particular content-request and determining that the particular content-request is authorized based on the unique user identifier.

3. The system of claim 1, wherein the vehicle is an aircraft, and wherein the license server is a ground-based server configured to communicatively connect to the in-vehicle network via an air-to-ground communication link.

4. The system of claim 1, wherein performing the authorization operation includes determining whether or not a token was issued to the particular mobile consumer device by the license server prior to the loss of connection, wherein the token indicates that the particular mobile consumer device or a particular user associated with the mobile consumer device is authorized to access the content associated with the particular content-request.

5. The system of claim 1, wherein performing the authorization operation includes processing payment information for the particular content-request to determine a payment has been made for the particular content-request.

6. The system of claim 5, wherein the instructions further cause the content delivery system to update license-data stored at a memory disposed at the vehicle to indicate that the particular mobile consumer device has been granted access rights for the content item.

7. The system of claim 1, wherein performing the authorization operation includes receiving and storing payment information for the particular content-request without processing the payment information.

8. The system of claim 1, wherein the instructions further cause the content delivery system to detect a re-establishment of the connection and to respond to the detected re-establishment by: (i) synchronizing with the license server and (ii) ceasing operating as the proxy for the license server.

9. The system of claim 1, wherein the content is encrypted when transmitted to the particular mobile consumer device; and
wherein the instructions further cause the content delivery system to transmit to the particular mobile consumer device a key for decrypting the content.

10. The system of claim 9, wherein the key is configured to decrypt the content for a temporary interval.

11. A method for providing an in-vehicle content-delivery service to mobile consumer devices, the method comprising:
implementing, at a vehicle, an in-vehicle content delivery system that is configured to: (i) communicatively couple to one or more mobile consumer devices via an in-vehicle network for the vehicle and (ii) communicatively couple to a license server that is external to the vehicle and that is configured to authorize or not authorize content-requests originating from the one or more mobile consumer devices;
detecting a loss of a connection between the in-vehicle content delivery system and the license server;
responding to the detected loss by operating the in-vehicle content delivery system as a proxy for the license server, including, while the content delivery system is disconnected from the license server, performing, at the in-vehicle content delivery system, an authorization operation to determine a particular content-request from a particular mobile consumer device is authorized; and
transmitting content to the particular mobile consumer device in response to the in-vehicle content delivery system determining, while the content delivery system remains disconnected from the license server, that the particular content-request from the particular mobile consumer device is authorized.

12. The method of claim 11, wherein performing the authorization operation includes analyzing a unique user identifier for the particular content-request and determining that the particular content-request is authorized based on the unique user identifier.

13. The method of claim 11, wherein the vehicle is an aircraft, and wherein the license server is a ground-based server configured to communicatively connect to the in-vehicle network via an air-to-ground communication link.

14. The method of claim 11, wherein performing the authorization operation includes determining whether or not a token was issued to the particular mobile consumer device by the license server prior to the loss of connection, wherein the token indicates that the particular mobile consumer device or a particular user associated with the mobile consumer device is authorized to access the content associated with the particular content-request.

15. The method of claim 11, wherein performing the authorization operation includes processing payment information for the particular content-request to determine a payment has been made for the particular content-request.

16. The method of claim 11, wherein performing the authorization operation includes receiving and storing payment information for the particular content-request without processing the payment information.

17. The method of claim 15, further comprising updating license-data stored at a memory disposed at the vehicle to indicate that the particular mobile consumer device has been granted temporary access rights for the content item.

18. The method of claim 11, further comprising detecting a re-establishment of the connection and responding to the detected re-establishment in a manner that includes: (i) synchronizing the in-vehicle content delivery system with the license server and (ii) ceasing operating the in-vehicle content delivery system as the proxy for the license server.

19. The method of claim 11, further including:
    encrypting the content before transmitting the content to the particular mobile consumer device; and
    transmitting to the particular mobile consumer device a key for decrypting the content.

20. The method of claim 19, wherein the key is configured to decrypt the content for a temporary interval.

\* \* \* \* \*